United States Patent
Hwang et al.

(10) Patent No.: US 11,968,604 B2
(45) Date of Patent: Apr. 23, 2024

(54) METHOD FOR PROVIDING V2X-RELATED SERVICE BY DEVICE IN WIRELESS COMMUNICATION SYSTEM SUPPORTING SIDELINK, AND DEVICE THEREFOR

(71) Applicant: LG Electronics Inc., Seoul (KR)

(72) Inventors: Jaeho Hwang, Seoul (KR); Hanbyul Seo, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 17/619,503

(22) PCT Filed: Aug. 5, 2020

(86) PCT No.: PCT/KR2020/010316
§ 371 (c)(1),
(2) Date: Dec. 15, 2021

(87) PCT Pub. No.: WO2021/025452
PCT Pub. Date: Feb. 11, 2021

(65) Prior Publication Data
US 2022/0386092 A1    Dec. 1, 2022

Related U.S. Application Data

(60) Provisional application No. 62/883,631, filed on Aug. 6, 2019, provisional application No. 62/883,627, filed on Aug. 6, 2019.

(51) Int. Cl.
*H04W 4/40* (2018.01)
*G01S 5/06* (2006.01)
(Continued)

(52) U.S. Cl.
CPC ............ *H04W 4/40* (2018.02); *G01S 5/06* (2013.01); *G08G 1/07* (2013.01); *G08G 1/16* (2013.01);
(Continued)

(58) Field of Classification Search
CPC .......... H04W 4/40; H04W 4/02; H04W 4/90; H04W 64/00; H04W 88/02; H04W 92/18;
(Continued)

(56) References Cited

U.S. PATENT DOCUMENTS

| 9,048,960 B2 * | 6/2015 | Li ........................ H04W 4/46 |
| 2016/0112889 A1 * | 4/2016 | Moon ................. H04B 7/0452 370/252 |

(Continued)

FOREIGN PATENT DOCUMENTS

| KR | 20180044992 | 5/2018 |
| KR | 1020180044992 | * 10/2018 |
| WO | WO2013163203 | 10/2013 |

OTHER PUBLICATIONS

International Search Report and Written Opinion in International Appln. No. PCT/KR2020/010316, dated Nov. 11, 2020, 18 pages (with English translation).
(Continued)

*Primary Examiner* — Omar CasillasHernandez
(74) *Attorney, Agent, or Firm* — Fish & Richardson P.C.

(57) ABSTRACT

According to various embodiments, disclosed are a method for providing a V2X-related service by a device comprising a plurality of distributed antennas in a wireless communication system supporting a sidelink, and a device therefor. Disclosed are a method for providing a V2X-related service by a device comprising a plurality of distributed antennas and a device therefor, the method comprising the steps of: receiving a first signal by each of the plurality of distributed
(Continued)

antennas; and determining whether to transmit a second signal for providing the V2X-related service, wherein transmission of the second signal is determined on the basis of a reception time at which the first signal is received between the plurality of distributed antennas and a threshold time.

12 Claims, 29 Drawing Sheets

(51) Int. Cl.
  *G08G 1/07* (2006.01)
  *G08G 1/16* (2006.01)
  *H04B 7/024* (2017.01)
  *B60W 60/00* (2020.01)

(52) U.S. Cl.
  CPC ........... *H04B 7/024* (2013.01); *B60W 60/001* (2020.02); *B60W 2556/45* (2020.02)

(58) Field of Classification Search
  CPC ......... G01S 5/06; G01S 2205/01; G08G 1/07; G08G 1/16; G08G 1/093; G08G 1/094; H04B 7/024; B60W 60/001; B60W 2556/45
  USPC ......................................................... 340/907
  See application file for complete search history.

(56) References Cited

U.S. PATENT DOCUMENTS

2019/0357033 A1* 11/2019 Cheng .................. H04W 76/27
2020/0022013 A1* 1/2020 Nguyen ................ H04L 1/0076
2020/0037126 A1* 1/2020 Lee ......................... H04W 4/40

OTHER PUBLICATIONS

Sony Corporation, "Considerations on RSU Deployment Scenarios," R1-155622, Presented at 3GPP TSG RAN WG1 Meeting #82BIS, Malmö, Sweden, Oct. 5-9, 2015, 6 pages.

* cited by examiner (a)

(b)

(a)

(b)

(a)

(b)

(a)

(b)

METHOD FOR PROVIDING V2X-RELATED SERVICE BY DEVICE IN WIRELESS COMMUNICATION SYSTEM SUPPORTING SIDELINK, AND DEVICE THEREFOR

CROSS-REFERENCE TO RELATED APPLICATIONS

This application is a National Stage application under 35 U.S.C. § 371 of International Application No. PCT/KR2020/010316, filed on Aug. 5, 2020, which claims the benefit of U.S. Provisional Application No. 62/883,631, filed on Aug. 6, 2019, and 62/883,627, filed on Aug. 6, 2019. The disclosures of the prior applications are incorporated by reference in their entirety.

TECHNICAL FIELD

The present disclosure relates to a method for providing a V2X-related service by a device based on signal processing of multiple distributed antennas in a wireless communication system supporting a sidelink, and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to estimate the location of a device transmitting a signal based on the difference in reception time of the signal between multiple distributed antennas, to provide an optimal V2X service corresponding to the estimated location, and to minimize the error of the provision of the V2X service by the signal including the location information having low accuracy.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

In one aspect of the present disclosure, a method for providing a V2X related service by a device including a plurality of distributed antennas in a wireless communication system supporting sidelink may include receiving a first signal through each of the plurality of distributed antennas, and determining whether to transmit a second signal for providing the V2X related service, wherein whether to transmit the second signal may be determined based on a reception time when the first signal is received through the plurality of distributed antennas and a threshold time.

Alternatively, the plurality of distributed antennas may include a first distributed antenna, a second distributed antenna, and a third distributed antenna distributed by a predetermined distance from each other.

Alternatively, the second signal may be transmitted when a difference between the reception time of a distributed antenna receiving the first signal first between the first distributed antenna and the third distributed antenna and the reception time of the second distributed antenna is less than the threshold time.

Alternatively, the threshold time is set differently according to a distributed antenna receiving the first signal first among the first distributed antenna, the second distributed antenna, and the third distributed antenna.

Alternatively, the predetermined distance may be predetermined based on a width of a road having the device positioned thereon.

Alternatively, a signal type of the second signal may be determined based on a distributed antenna receiving the first signal first among the first distributed antenna, the second distributed antenna, and the third distributed antenna.

Alternatively, on a basis that the first signal is first received through the second distributed antenna, the second signal may be a warning signal notifying nearby vehicles of presence and danger of a pedestrian on a road.

Alternatively, on a basis that the first signal is first received through the first distributed antenna or the third distributed antenna, the second signal may be a control signal for controlling a signal of an adjacent traffic light.

Alternatively, on a basis that the first signal is first received through the first distributed antenna or the third distributed antenna, the second signal is a signal indicating correction of VRU position information included in the first signal.

Alternatively, the plurality of distributed antennas may include a first distributed antenna and a second distributed antenna distributed by a predetermined distance from each other.

Alternatively, the second signal may be transmitted when a difference between a reception time when the first signal is received through the first distributed antenna and a reception time when the first signal is received through the second distributed antenna is less than the threshold time.

Alternatively, the first signal may be a personal safety message (PSM) transmitted from a vulnerable road user (VRU), and the device may be a road side unit (RSU).

In another aspect of the present disclosure, a device for providing a V2X related service in a wireless communication system supporting sidelink may include a plurality of distributed antennas including a radio frequency (RF), and a processor connected to the plurality of distributed antennas, wherein the processor may be configured to control the plurality of distributed antennas to receive a first signal through each of the plurality of distributed antennas, calculate a reception time when the first signal is received through each of the plurality of distributed antennas, and determine whether to transmit a second signal for providing the V2X related service based on the calculated reception time and the threshold time.

In another aspect of the present disclosure, a chipset for providing a V2X related service in a wireless communication system supporting sidelink may include at least one processor, and at least one memory operatively coupled to the at least one processor and configured to cause, when executed, the at least one processor to perform an operation. The operation may include receiving a first signal through each of a plurality of distributed antennas, calculating a reception time when the first signal is received through each of the plurality of distributed antennas, and determining whether to transmit a second signal for providing the V2X related service based on the calculated reception time and a threshold time.

Alternatively, the processor may generate a control signal related to autonomous driving based on the second signal.

In another aspect of the present disclosure, a computer-readable storage medium in a wireless communication system supporting sidelink may include at least one computer program causing at least one processor to perform an operation of providing a V2X related service, and a computer-readable storage medium storing the at least one computer program, wherein the operation may include receiving a first signal through each of a plurality of distributed antennas, calculating a reception time when the first signal is received through each of the plurality of distributed antennas, and determining whether to transmit a second signal for providing the V2X-related service based on the calculated reception time and a threshold time.

Advantageous Effects

According to various embodiments, the location of a device transmitting a signal may be estimated based on the difference in reception time of the signal between multiple distributed antennas, an optimal V2X service corresponding to the estimated location may be provided, and the error in provision of the V2X service by the signal including the location information having low accuracy may be minimized.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

MODE FOR DISCLOSURE

Figure 1:
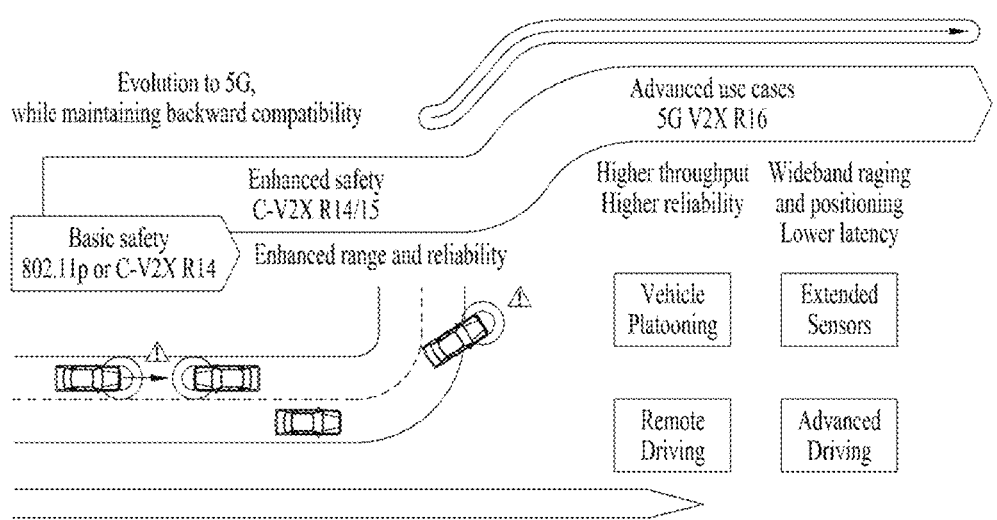
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
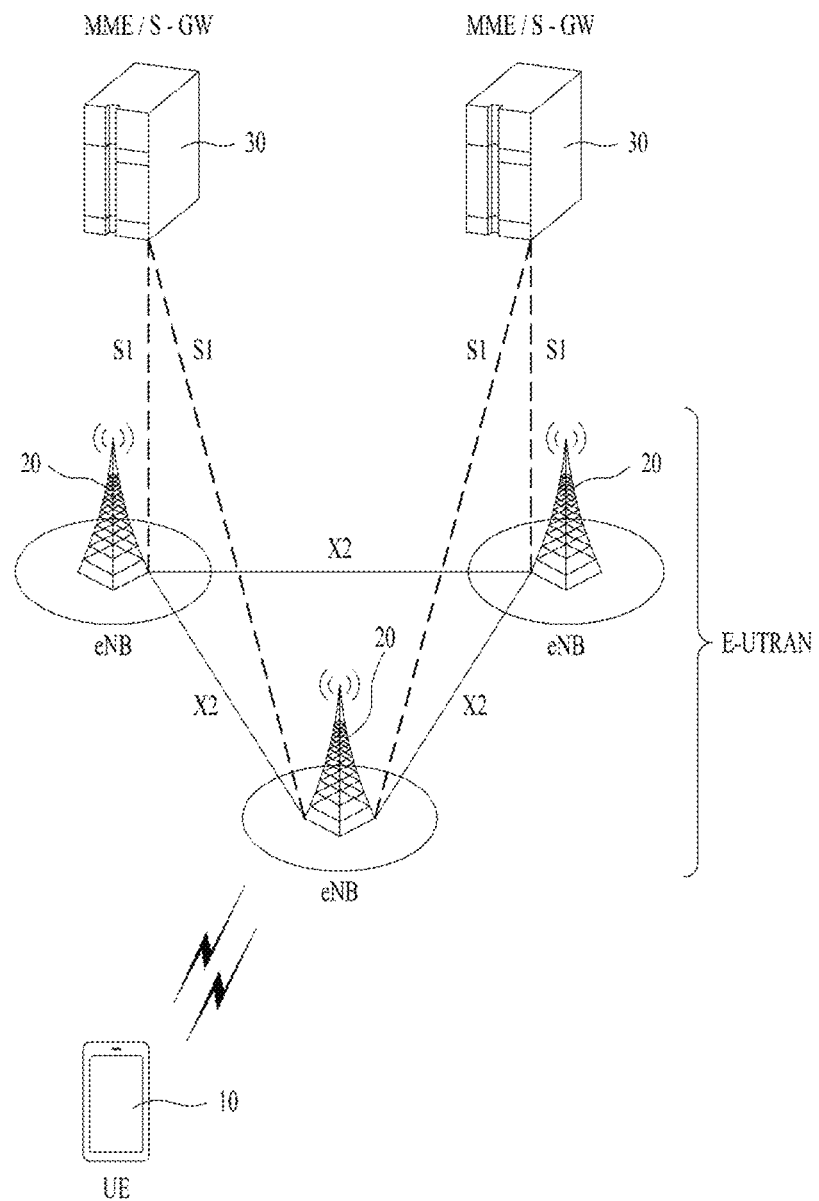
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
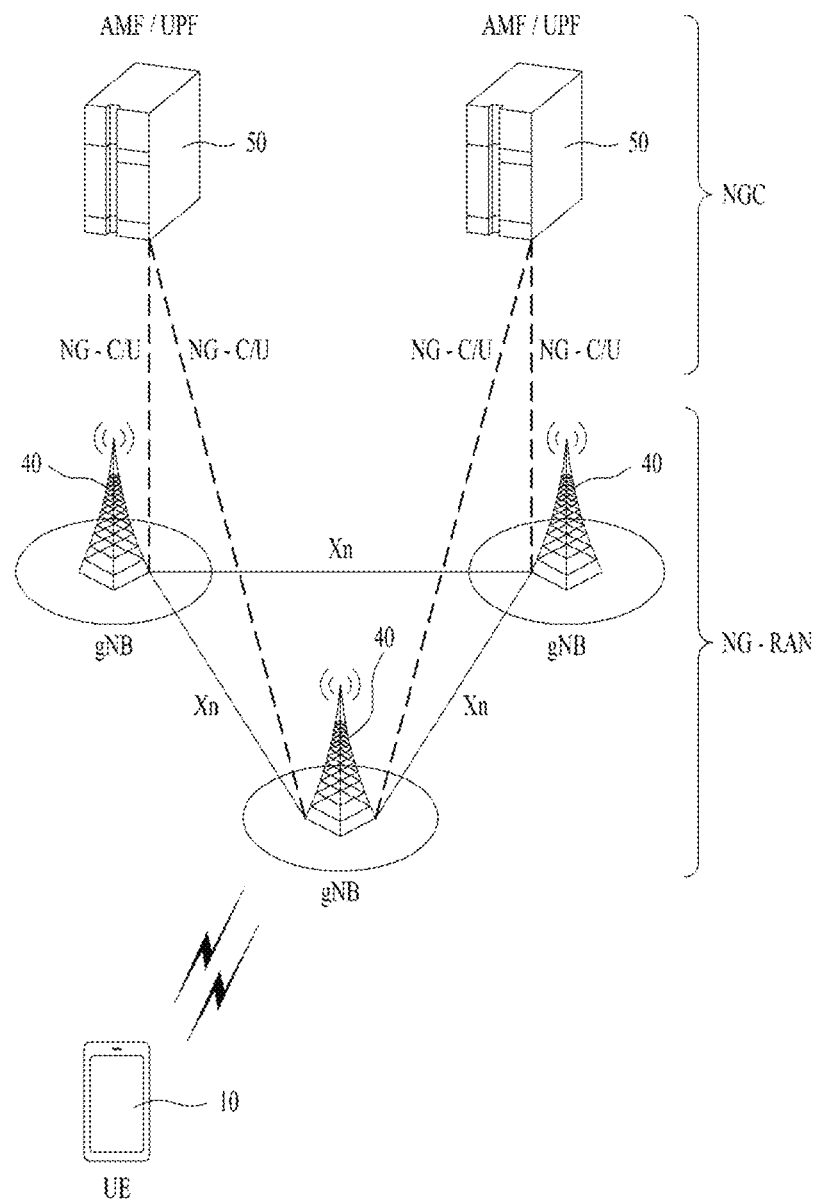
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
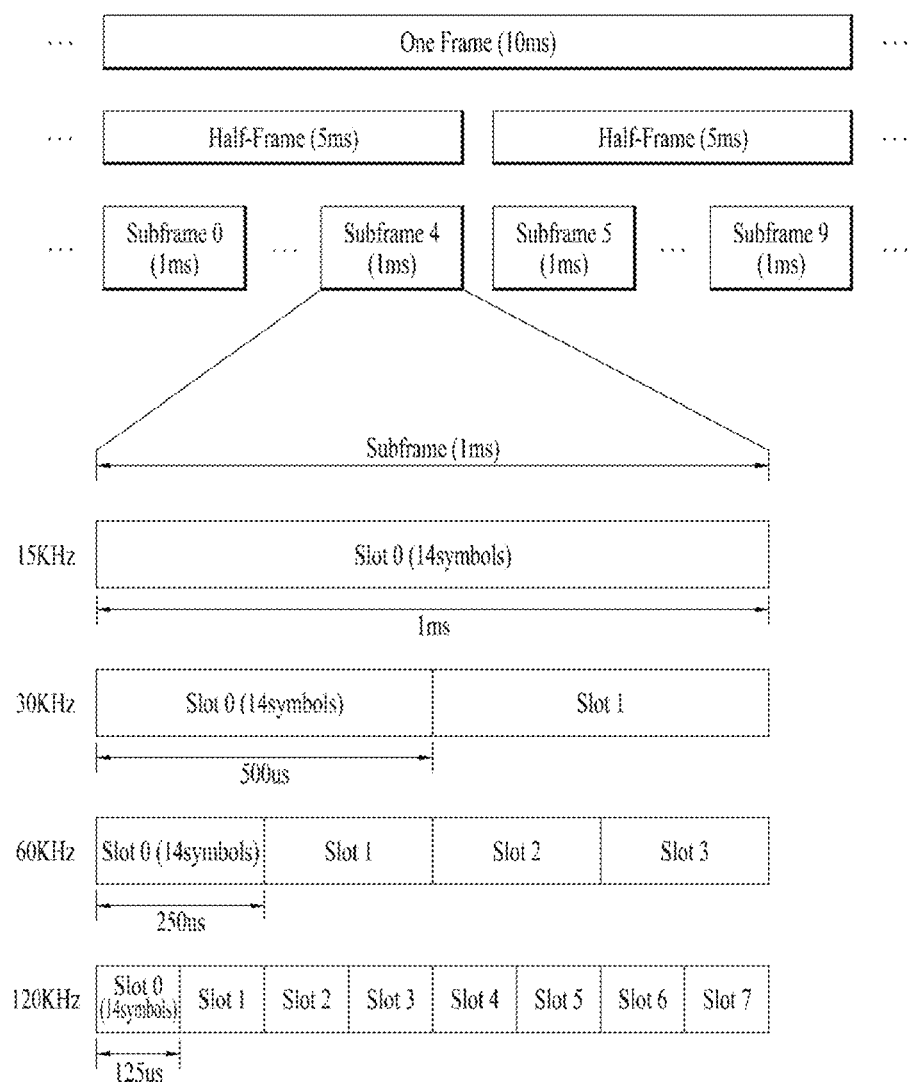
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
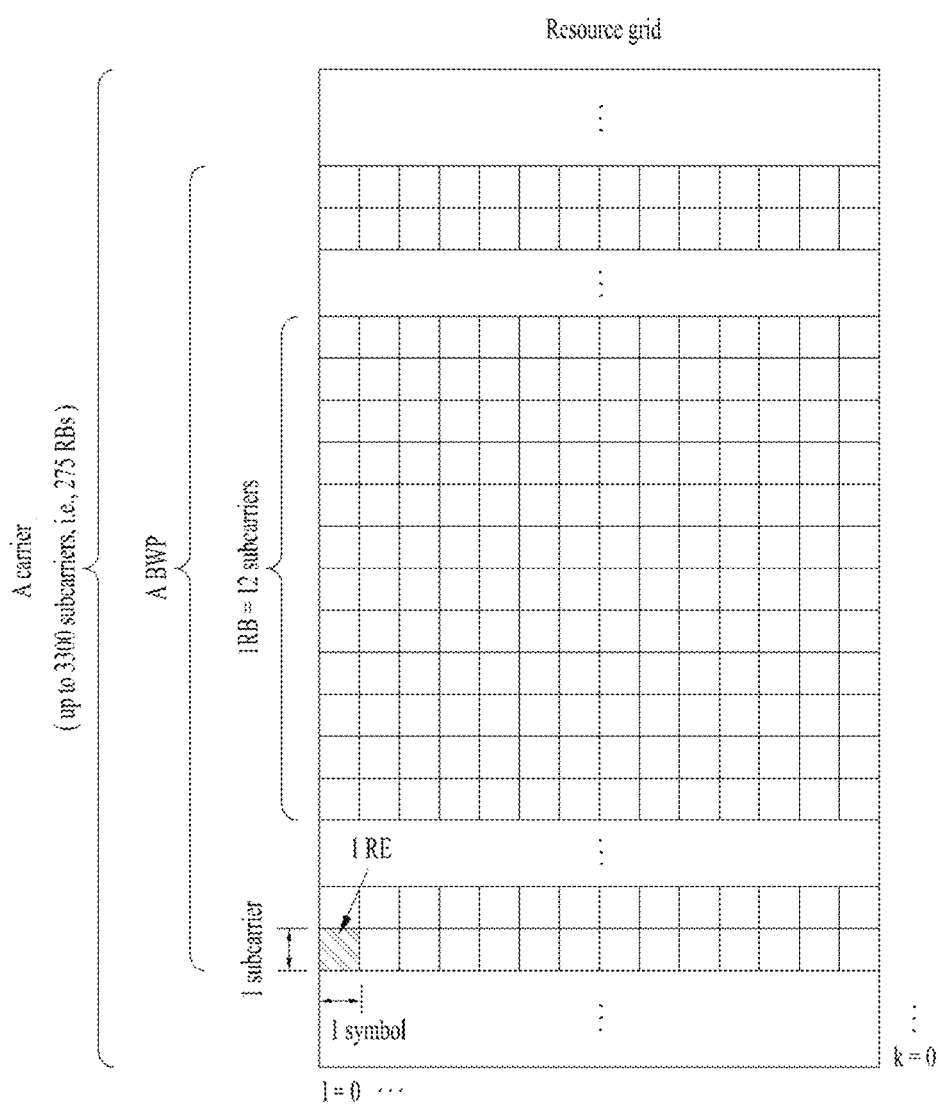
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
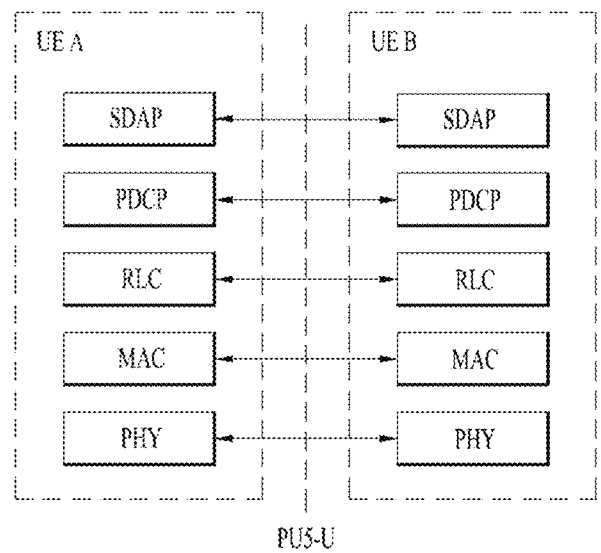
FIG. 6 illustrates a radio protocol architecture for SL communication.
Figure 6:
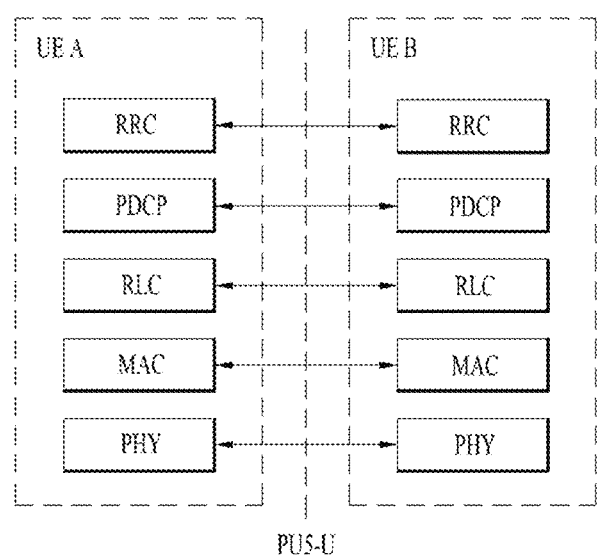

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
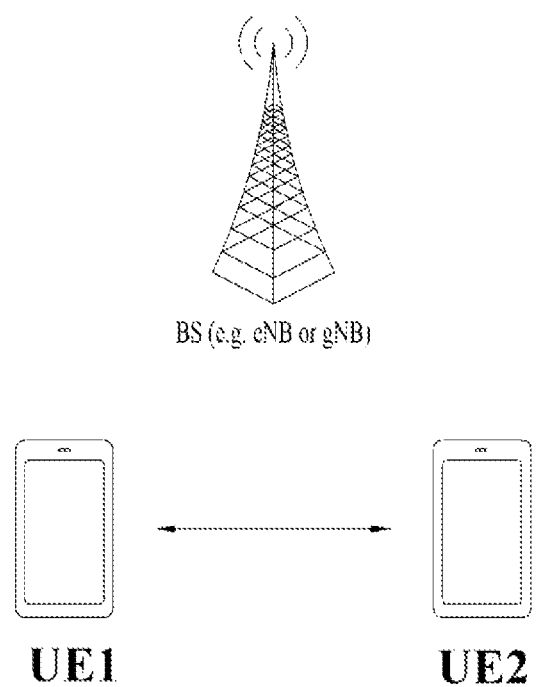
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
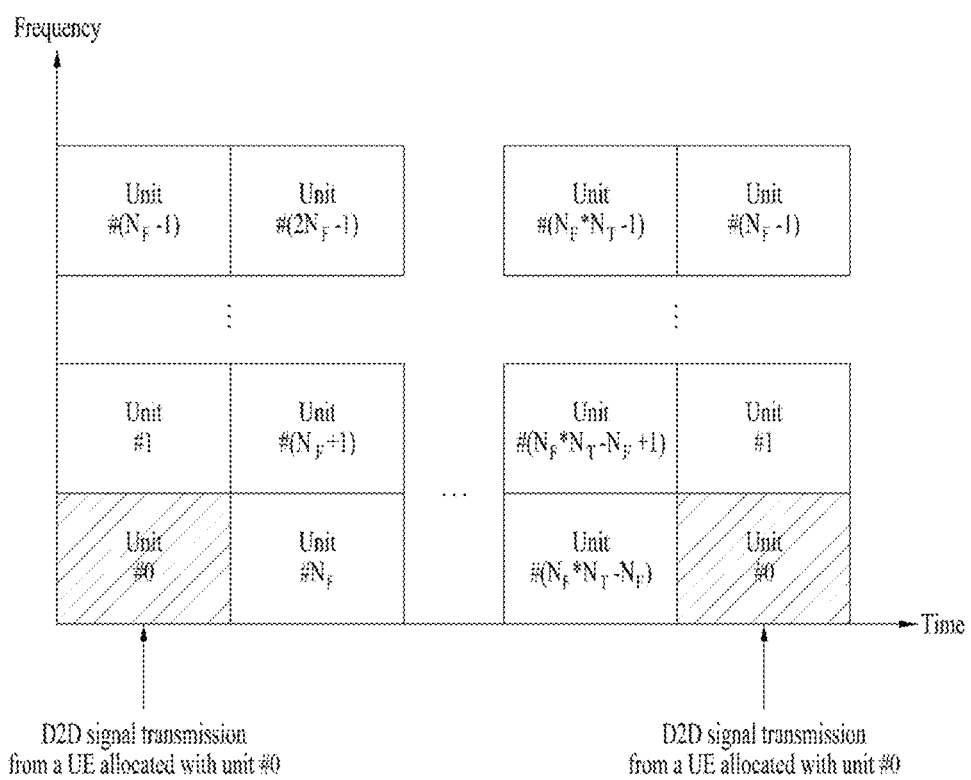
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of $N_T$ subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
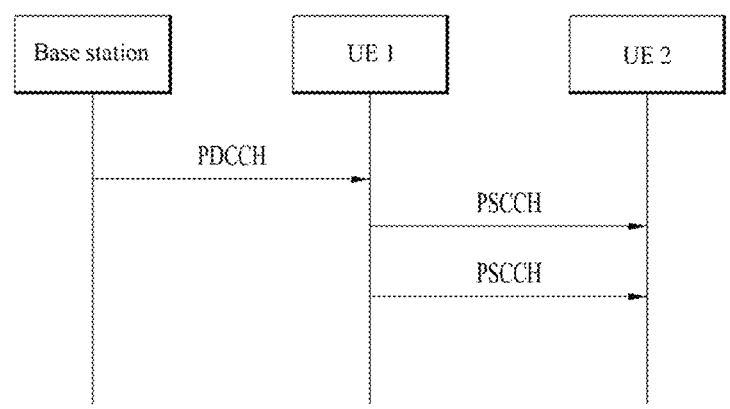
FIG. 9 illustrates a procedure in which UEs perform V2X or SL communication according to a transmission mode.
Figure 9:
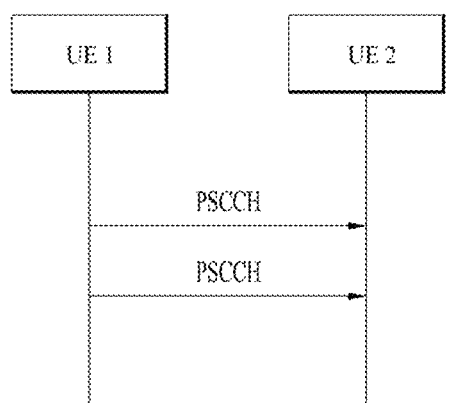

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Recognition of VRU Position Using an RSU Having Multiple Distributed Antennas

Conventionally, VRUs may protect themselves from surrounding vehicles by periodically transmitting their positions to the surrounding vehicles through their V2X devices. A vehicle including a V2X device may be traveling within a designated road, but a VRU may move across sidewalks and roads. In this regard, the surrounding vehicle or RSU is required to relatively accurately recognize its position with respect to the VRU. However, the VRU may measure the position with low accuracy compared to the vehicle in terms of structure and function such as the antenna structure and installation position. In this regard, there is a need for a method for improving position recognition or measurement capability of a VRU and/or a system capable of measuring an accurate position of the VRU.

Figure 10:
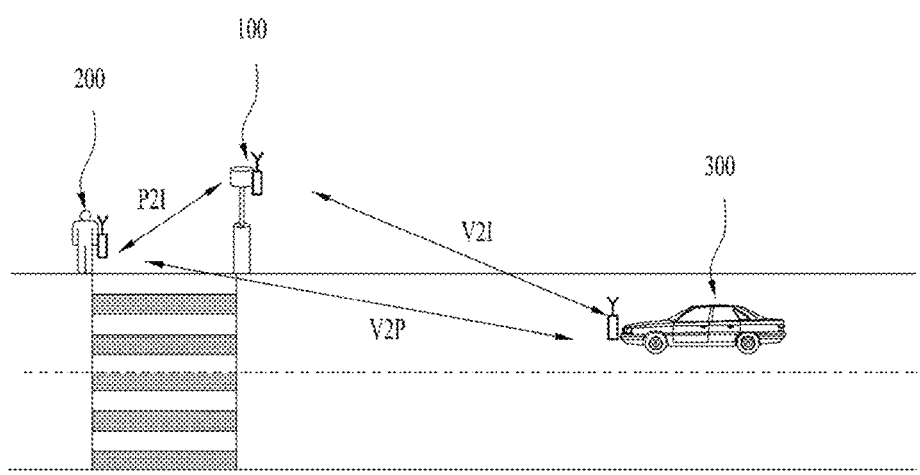
FIG. 10 schematically illustrates a V2X system.

FIG. 10 schematically illustrates a V2X system.

Referring to FIG. 10, the VRU may transmit a VRU signal including information about its own position to a vehicle and/or an RSU using a P2I connection and/or a V2P connection. Here, the VRU signal may include position information with relatively low accuracy in terms of structure and performance of the VRU.

In order to address the issue of low accuracy of position information included in the VRU signal, it is proposed in the present disclosure that a device (RSU, V2X device, etc.) fixed to a specific position (traffic light, signboard, etc.) receive a VRU signal (or V2X signal) from the VRU and accurately estimate or determine the position of the VRU based on the received VRU signal. In this case, the RSU may provide a service suitable for the VRU based on the estimated or determined position of the VRU, or may provide more accurate state information about the VRU to the VRU and nearby vehicles. Here, the VRU signal and/or the V2X signal may be defined as a VRU signal and/or a V2X signal.

Figure 11:
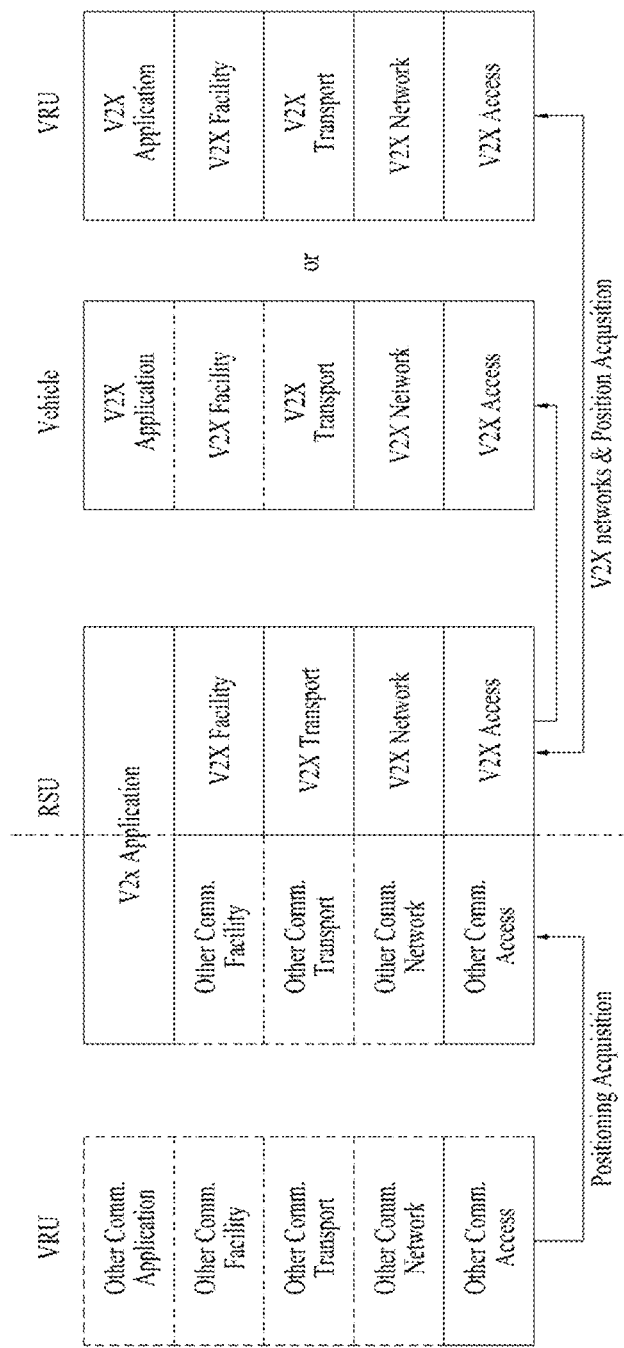
FIG. 11 is a diagram illustrating a structure of communication performed among a VRU, an RSU, and a VRU.

FIG. 11 is a diagram illustrating a structure of communication performed between VRUs and an RSU.

Referring to FIG. 11, there are two methods for estimating a VRU by an RSU according to the VRU signal used. According to one method, when the VRU has a device capable of transmitting a V2X signal, the RSU may perform position estimation based on the VRU signal using the network stack on the right side of the dotted line in FIG. 11. Alternatively, the RSU may receive a V2X signal transmitted by the VRU and estimate the position of the VRU, and the RSU may provide a suitable service to a nearby VRU and a nearby vehicle based on the estimated VRU position through the V2X stack.

According to the other method, when the VRU sends a signal of a communication system (e.g., Wi-Fi, DSRC, BLE, Bluetooth, Zigbee, UWB, sound wave communication, ultrasonic communication, infrared communication, etc.) different from the V2X, the RSU may estimate the position of the VRU based on a heterogeneous signal. In this case, the RSU may provide or carry out a service optimized for a non-V2X VRU based on the estimated position of the VRU, or may provide a VRU safety service to nearby vehicles via a V2X link (or Wi-Fi, DSRC, BLE, Bluetooth, Zigbee, UWB).

Figure 12:
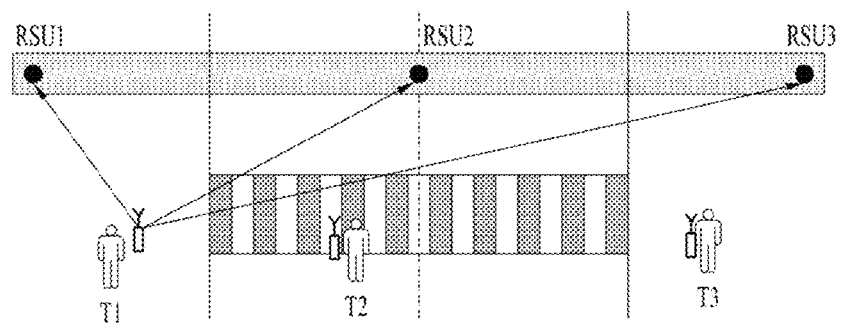
FIGS. 12 and 13 illustrate a method for estimating a location of an adjacent VRU by an RSU using three distributed antennas.
Figure 12:
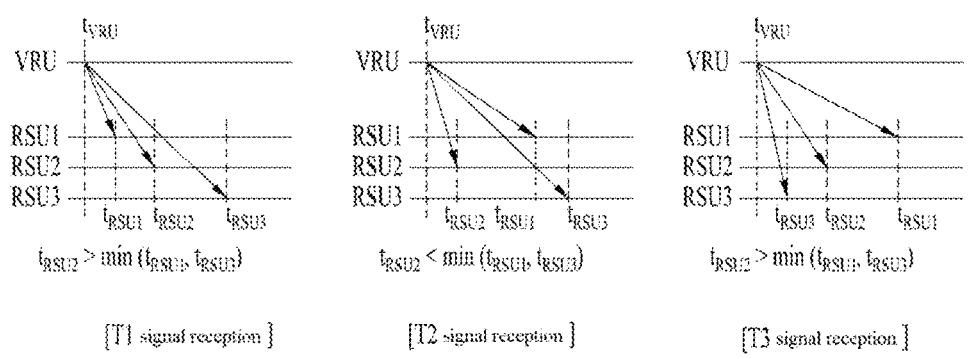
Figure 13:
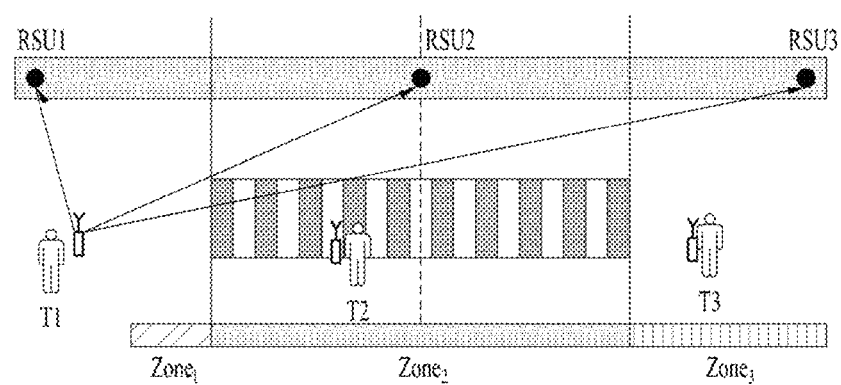
Figure 13:
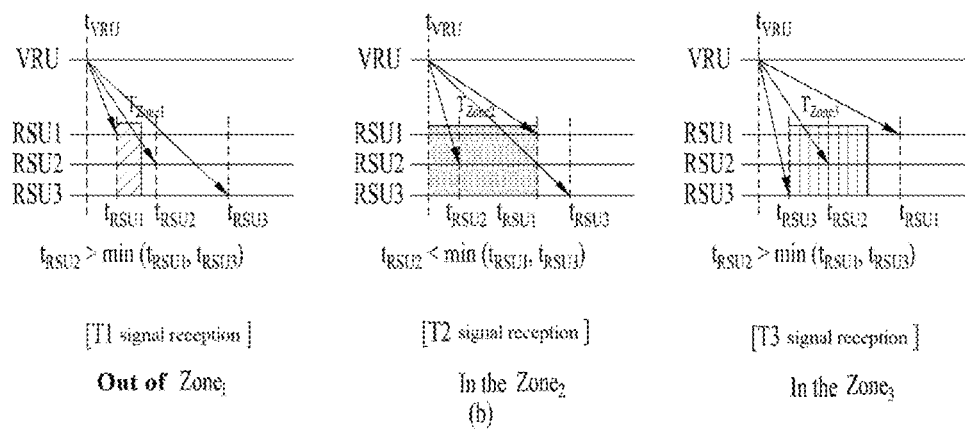

FIGS. 12 and 13 illustrate a method for estimating a position of an adjacent VRU by an RSU using three distributed antennas.

Referring to FIG. 12-(a), the RSU may estimate the position of the VRU using three distributed antennas spaced apart by a preset distance. Here, the three distributed antennas may be sequentially distributed while being spaced apart by a preset distance with respect to one straight line or direction. For example, the straight line or direction may correspond to the travel direction at the crosswalk as shown in FIG. 12-(a). The preset distance may be determined based on the width of the road, the length of the crosswalk, or the position of the center line. For example, as shown in FIG. 12, among the three distributed antennas, a second distributed antenna RSU2 may be positioned in the middle of the road (or on the center line), and a first distributed antenna RSU1 and a third distributed antenna RSU3 may be disposed at positions separated from the road boundaries toward the sidewalks by a distance equal to the distance between the second distributed antenna and the road boundaries. The position of the VRU may be accurately estimated by comparing the signals received by the three distributed antennas distributed in this way.

Specifically, when the VRU is present in a first zone (a corresponding position at time T1), the RSU may receive the VRU signal (or RF signal) transmitted by the VRU through each of the three reception antennas (or three distributed antennas). In this case, each signal (or VRU signal) has a different reception time because the distance from the VRU is different. In other words, the reception timing at which the VRU signal is received through each antenna may be may depend on the distance between each antenna and the VRU.

Referring to FIG. 12-(b), when the VRU is positioned in the first zone, the VRU signal may be first received through the first distributed antenna RSU 1, then through the second distributed antenna RSU 2 and the third distributed antenna RSU 3 sequentially. In this case, the RSU may not clearly identify the timing at which the VRU transmitted the VRU signal, but may estimate that the VRU is positioned in the first zone (on a sidewalk close to RSU1 outside the crosswalk) based on the reception of the VRU message through the first distributed antenna, the second distributed antenna, and then the third distributed antenna in order. In this case, the RSU may transmit a signal or a signal for providing the V2X service corresponding to the first zone to the nearby vehicle or the VRU.

Alternatively, when the VRU is in a second zone (the middle position on the crosswalk at time T2), the VRU signal may be first received through the second distributed antenna RSU 2. Then, the VRU signal may be sequentially received through the first distributed antenna RSU 1 and the third distributed antenna RSU 3. In this case, the RSU may recognize or estimate that the VRU is positioned on the left crosswalk (i.e., the crosswalk close to the first distributed antenna) in the second zone. In this case, the RSU may transmit a signal or a signal for providing the V2X service corresponding to the second zone to the nearby vehicle or the VRU.

Alternatively, when the VRU crosses the center line (toward the third distributed antenna), the VRU signal may be first received by the second distributed antenna RSU 2. Then, the VRU signal may be sequentially received through the third distributed antenna RSU 3 and the first distributed antenna RSU 1. In this case, the RSU may recognize or estimate that the VRU is positioned on the right crosswalk (toward the third distributed antenna) in the second zone. Then, the RSU may transmit a signal or a signal for providing the V2X service corresponding to the second zone to the nearby vehicle or the VRU.

Alternatively, when the VRU crosses the crosswalk and is positioned in a third zone (or the position corresponding to time T3), the VRU signal may be first received through the third distributed antenna RSU 3. Then, the VRU signal may be sequentially received through the second distributed antenna RSU 2 and the first distributed antenna RSU 1. In this case, the RSU may estimate or recognize that the VRU is positioned on the sidewalk where RSU3 is positioned (i.e., the third zone) outside the crosswalk. In this case, the RSU may transmit a signal or a signal for providing the V2X service corresponding to the third zone to the nearby vehicle or the VRU.

Referring to FIG. 13-(a), the RSU may define a separate threshold time for determining whether it is positioned in a sidewalk zone adjacent to a crosswalk. Referring to FIG. 13-(b), a first threshold time $T_{zone1}$ for determining whether a VRU is positioned in a first zone Zone1, a second threshold time $T_{zone2}$ for determining whether the VRU is positioned in a second zone Zone2, and a third threshold time $T_{zone3}$ for determining whether the VRU is positioned in a third zone Zone3 may be set. Here, the first threshold time and the third threshold time may be the same. Alternatively, the first threshold time and the third threshold time may each be set based on characteristics (width, street trees, density of VRUs, CR, CBR, etc.) related to a sidewalk adjacent to the crosswalk, the height of the distributed antenna of the RSU, a width of each zone, and the like.

Specifically, when the VRU is positioned outside the first zone Zone1, the difference between a second reception time $T_{RSU2}$ at which the VRU signal of the VRU is received through the second distributed antenna and a first reception time $T_{RSU1}$ at which the VRU signal is received through the first distributed antenna is greater than the first threshold time $T_{zone1}$. In this case, the RSU may estimate or recognize that the VRU is positioned in an area outside the first zone (or an area outside the first to third zones).

Alternatively, when the VRU is positioned in the third zone, the difference between the second reception time when the VRU signal is received through the second distributed antenna and the third reception time when the VRU signal is received through the third distributed antenna may be less than or equal to or below the threshold time $T_{zone3}$. In this case, the RSU may estimate or recognize that the VRU is positioned in the third zone.

Hereinafter, for simplicity, the first reception time is defined as a reception timing at which the VRU signal is received through the first distributed antenna, the second reception time is defined as a reception timing at which the VRU signal is received through the second distributed antenna, and the third reception time is defined as a reception timing at which the VRU signal is received through the third distributed antenna. Here, the VRU signal received through each of the first to third distributed antennas may be the same signal transmitted from the VRU at a specific timing. In addition, a difference in time between the first reception time and the second reception time may be defined as a first difference, and a difference in time between the second reception time and the third reception time may be defined as a second difference.

In this way, the RSU may estimate the position of the VRU based on at least one of a reception time when the VRU signal is received through each of the distributed antennas, the first threshold time, the second threshold time, and the third threshold time, determine a V2X service suitable for the estimated VRU position, and transmit a signal or a signal corresponding to the determined V2X service to the nearby vehicle and/or the VRU.

Figure 14:
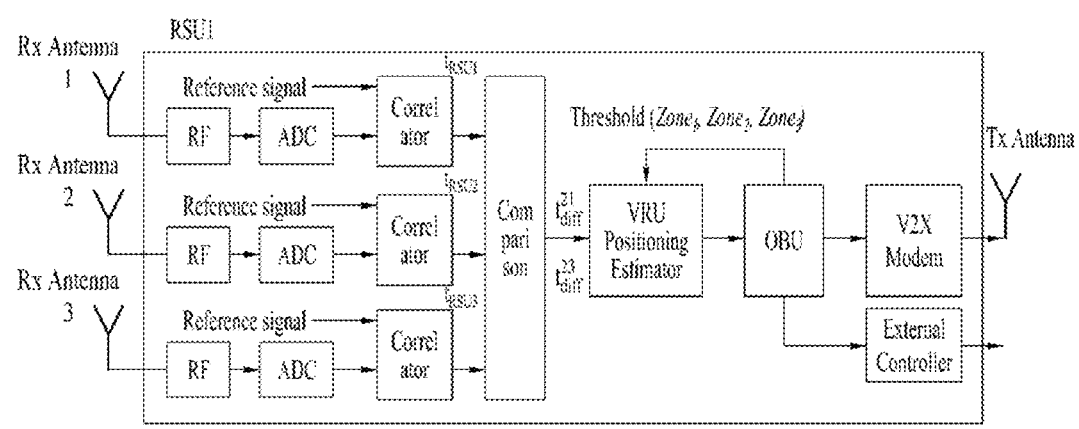
FIGS. 14 and 15 illustrate a system configuration and system operation method for an RSU including three distributed antennas.

FIG. 14 is a block diagram schematically illustrating a system configuration of an RSU including three distributed antennas.

Referring to FIG. 14, the RSU may include a first distributed antenna (Rx Antenna 1), a second distributed antenna (Rx Antenna 2), and a third distributed antenna (Rx Antenna 3). Each of the first distributed antenna, the second distributed antenna, and the third distributed antenna may receive a signal through an RF module and an ADC block. Thereafter, the RSU may estimate a reception time of a signal received through each of the distributed antennas based on correlation using a reference signal. Thereafter, the comparison block may calculate a difference between the estimated reception times on the respective distributed antennas. In this regard, a VRU position estimator is provided with the value of at least one threshold time (first threshold time, second threshold time, and/or third threshold time) from an OBU (a unit providing VRU positioning service). The VRU position estimator may estimate the position of the VRU through the above-described algorithm based on the first difference, the second difference, and the at least one threshold time. Thereafter, the OBU may provide a V2X service corresponding to the position of the VRU based on the estimated VRU position.

Figure 15:
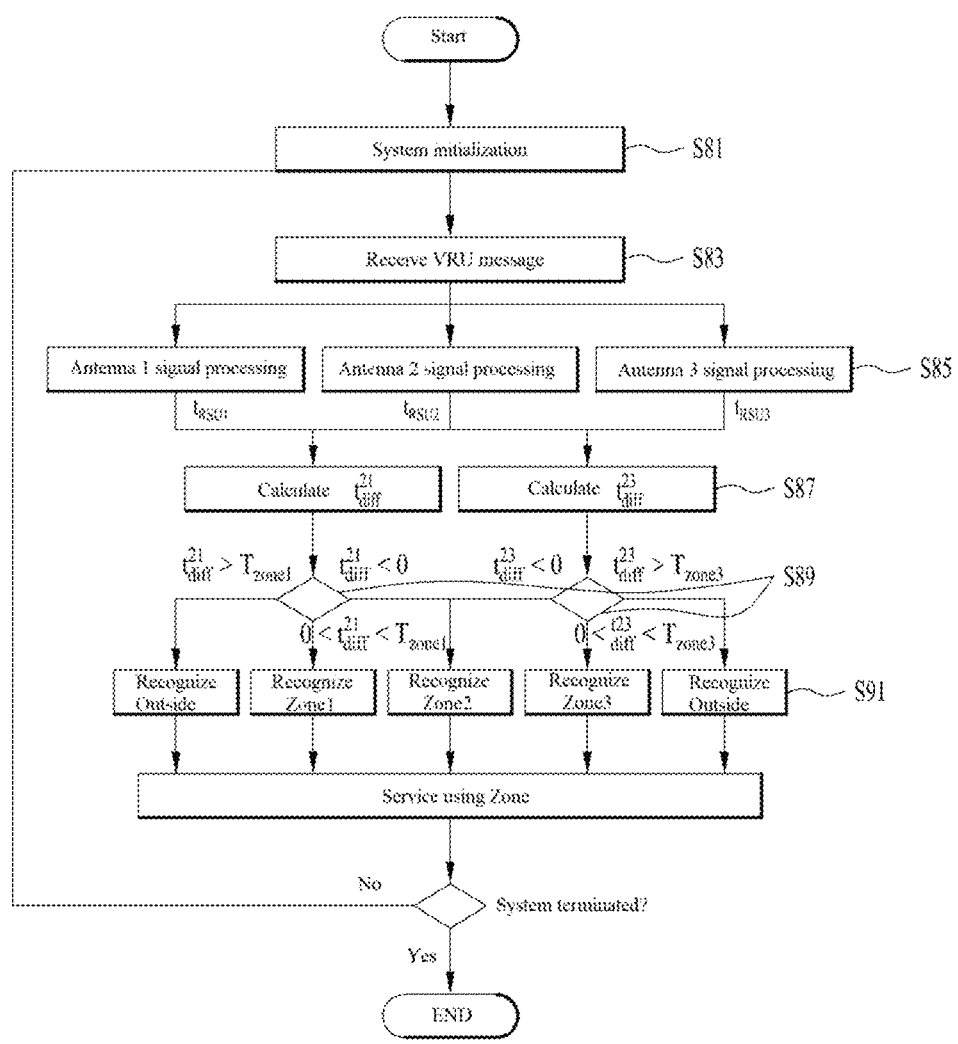

Referring to FIG. 15, when the system is started, the RSU or VRU position estimator may perform initialization and wait to receive a VRU signal (S81).

Next, the RSU may receive a signal of the VRU (or VRU signal) through each of the first distributed antenna, the second distributed antenna, and the third distributed antenna (S83). In this case, the RSU may process the signals received through each of the first to third antennas to estimate the reception times (first reception time, second reception time, and third reception time) for the respective distributed antennas (S85).

For example, the RSU may digitally process the analog signals received through the respective distributed antennas through the ADC, find a peak point using the correlation of the digitally processed signals with the reference signal, and calculate times corresponding to the peak point as the first reception time, the second reception time, and the third reception time.

Next, the RSU may calculate a first difference $t_{diff}^{21}$ which is a timing difference between the first reception time and the second reception time, and a second difference $t_{diff}^{23}$ which is a timing difference between the second reception time and the second reception time (S87).

Specifically, the RSU may estimate or determine a zone where the RSU is positioned among the first zone, the second zone, the third zone, and the other zone (zone outside the first to third zones), based on the first difference and the second difference (S89).

Specifically, the RSU may calculate the first difference $t_{diff}^{21}$ by subtracting the first reception time calculated for the first antenna from the second reception time calculated for the second distributed antenna. In this case, if the first difference is negative, it may be estimated that the VRU is positioned in the second zone. If the first difference is greater than 0 and less than or equal to (or below) the first threshold time, the RSU may estimate or determine that the VRU is positioned in the first zone. If the first difference is greater than 0 and above (or is greater than or equal to) the first threshold time, the RSU may estimate or determine that the VRU is positioned outside the first zone.

Alternatively, the RSU may calculate the second difference $t_{diff}^{23}$ by subtracting the third reception time calculated for the first antenna from the second reception time calculated for the second distributed antenna. In this case, if the second difference is negative, it may be estimated that the VRU is positioned in the second zone. If the second difference is greater than 0 and less than or equal to (or below) the third threshold time, the RSU may estimate or determine that the VRU is positioned in the third zone. If the second difference is greater than 0 and above (or is greater than or equal to) the third threshold time, the RSU may estimate or determine that the VRU is positioned outside the third zone.

Alternatively, when it is estimated or recognized that the VRU is positioned in a specific zone, the RSU may transmit a signal or a signal including information about a V2X service corresponding to the zone and control information. On the other hand, when it is determined that the VRU is not positioned in the specific zone, the RSU may not transmit a signal or a signal including the information about the V2X service and the control information. Here, the specific zone may include at least one of the first to third zones.

As disclosed above, according to the present disclosure, a reception time when a VRU signal is received through each of the distributed antennas may be calculated, and a zone where the VRU is positioned may be considerably accurately estimated based on the difference between the calculated reception times. In this case, even when a VRU signal including inaccurate position information is transmitted due to a limitation of the position measurement performance of the VRU, the RSU may accurately identify the position of the VRU through a difference in reception time between the distributed antennas regardless of the position information included in the VRU signal. In addition, according to the present disclosure, an appropriate V2X service or the like may be provided to a nearby vehicle and/or the VRU based on the estimated VRU position. Related details will be described later with reference to FIGS. 21 to 23.

Hereinafter, a method for estimating the position of a VRU by an RSU using two distributed antennas will be described in detail.

Figure 16:
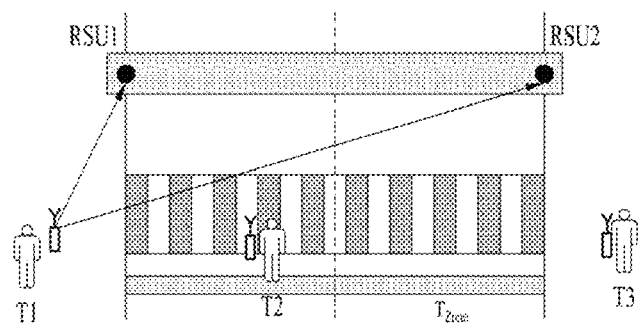
FIG. 16 illustrates a method for estimating a location of an adjacent VRU by an RSU using two distributed antennas.

FIG. 16 illustrates a method for estimating a location of an adjacent VRU by an RSU using two distributed antennas.

Referring to FIG. 16, an RSU (or UE) may estimate the position of a VRU that has transmitted a VRU signal, using two antennas (or two distributed antennas). Here, the two distributed antennas may be distributed antennas disposed one at each boundary between the road and the sidewalks, as shown in FIG. 16. The RSU may accurately estimate or determine the position of the VRU by comparing the VRU signals received through each of the two distributed antennas.

Specifically, the VRU may transmit a VRU signal using an RF module or the like at a position adjacent to the RSU. In this case, the RSU may receive the VRU signal sent or transmitted from the RF of the VRU through each antenna. In this case, due to a difference in distance between the VRU (or RF of the VRU) and each of the two distributed antennas, the first distributed antenna and the second distributed antenna may receive the VRU signal at different timings. The RSU may estimate the position of the VRU based on the difference between the reception timings. As described above, the timing at which the VRU signal is received through the first distributed antenna RSU1 is defined as a first reception time, the timing at which the VRU signal is received through the second distributed antenna RSU2 is defined as a second reception time, and the difference between the first reception time and the second reception time is defined as a first difference.

For example, when the VRU is positioned in the middle of a crosswalk (or the distance between the VRU and the first distributed antenna is the same as the distance between the VRU and the second distributed antenna), the first distributed antenna RSU1 and the second distributed antenna RSU2 may receive a signal transmitted by a specific VRU or a VRU signal at the same time. Alternatively, when the VRU is positioned closer to the first distributed antenna, the VRU signal may be first received through the first distributed antenna between the first distributed antenna and the second distributed antenna. Alternatively, when the VRU is positioned closer to the second distributed antenna, the VRU signal may be first received through the second distributed antenna between the first distributed antenna and the second distributed antenna.

That is, depending on the positional relationship between the first distributed antenna, the second distributed antenna, and the VRU, the reception time of the VRU signal may differ between the first distributed antenna and the second distributed antenna. The VRU signal received by each of the first distributed antenna and the second distributed antenna may be one VRU signal transmitted from a corresponding VRU.

Alternatively, the RSU may estimate the position of the VRU more accurately based on the difference (hereinafter, first difference) in reception timing of the VRU signal between the first distributed antenna and the second distributed antenna and a preset threshold time T_zone. For example, the RSU may estimate whether the VRU approaches a crosswalk boundary based on a result of comparison between the first difference and the preset threshold time.

For example, when the difference between the reception timings is greater than or equal to the preset threshold time, the RSU may estimate or determine that the VRU is positioned close to the crosswalk boundary.

Figure 17:
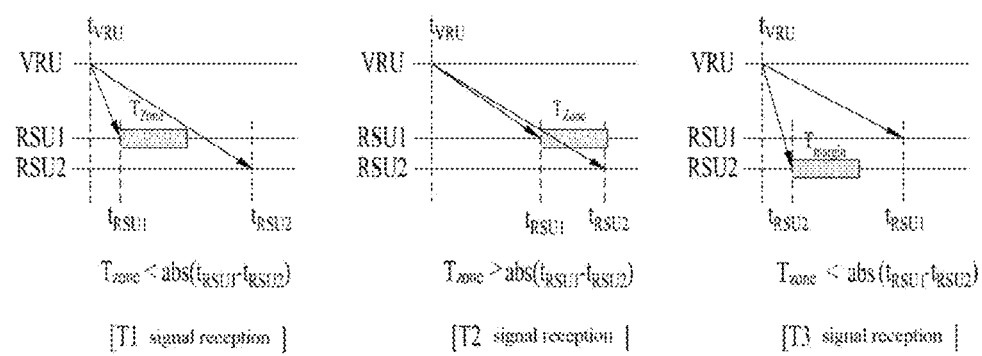
FIGS. 17 and 18 illustrate a method for estimating a location of a VRU by an RSU based on a difference in reception timing of a VRU signal received through two distributed antennas.
Figure 18:
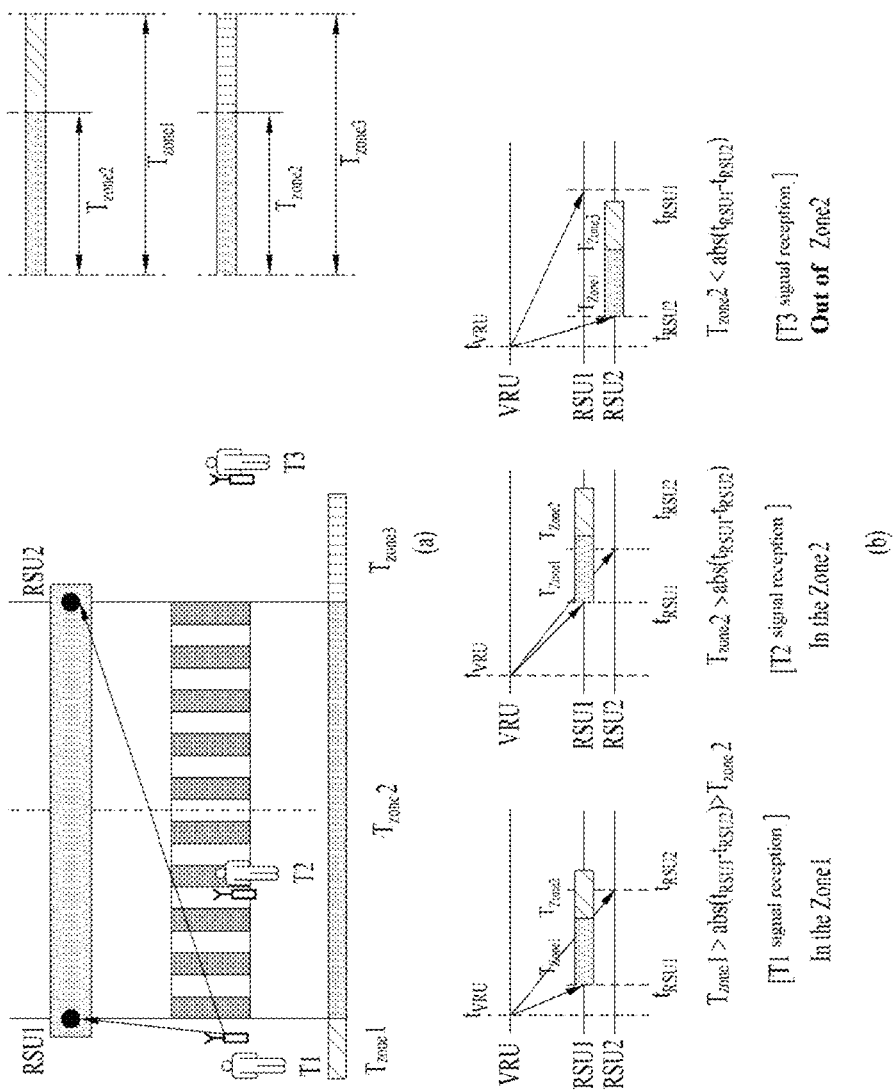

FIGS. 17 and 18 illustrate a method for estimating a location of a VRU by an RSU based on a difference in reception timing of a VRU signal received through two distributed antennas.

Referring to FIG. 17, based on the first difference and the preset threshold time T_zone, the RSU may estimate whether the VRU is positioned in a first zone (or a zone corresponding to time T1), a second zone (or a zone corresponding to time T2), or a third zone (or a zone corresponding to time T3).

First, the RSU may estimate that the VRU is positioned in the first zone or the third zone when the first difference is greater than or equal to the preset threshold time. Alternatively, the RSU may accurately estimate a zone where the VRU is positioned between the first zone and the third zone, based on the order of the VRU signals received.

Specifically, when the first difference greater than the preset threshold time is calculated and the VRU signal is first received through the first distributed antenna RSU1, the RSU may estimate or determine that the VRU is positioned in the first zone (or a position corresponding to time TI).

Alternatively, when the first difference greater than the preset threshold time is calculated and the VRU signal is first received through the second distributed antenna RSU2, it may be estimated that the VRU is positioned in the third zone (or a position corresponding to time T3). That is, when the difference in reception timing between the distributed antennas is greater than the first threshold time, the RSU may estimate that the VRU is positioned in an adjacent sidewalk outside the crosswalk.

Alternatively, when the first difference is calculated to be less than the preset threshold time T_zone, the RSU may estimate or determine that the VRU is positioned in the second zone, which is a crosswalk area. Further, when the VRU signal is received through the first distributed antenna and then the second distributed antenna, the RSU may estimate that the VRU is positioned closer to the first distributed antenna in the second zone. When the VRU signal is received through the second distributed antenna and then the first distributed antenna, the RSU may estimate that the VRU is positioned closer to the second distributed antenna in the second zone.

Alternatively, referring to FIG. 18-(a), the RSU may estimate the position of the VRU, considering a first threshold time T_zone1, a second threshold time T_zone2, and a third threshold time T_zone3 together. Here, the second threshold time is the preset threshold time described with reference to FIG. 17, and is used to determine whether the VRU is positioned in the second zone where a crosswalk is positioned, and the first threshold time and/or the third threshold time has a value greater than the second threshold time and is used to determine whether the VRU is positioned within a predetermined distance from a boundary between the crosswalk and the sidewalks.

In other words, the RSU may estimate or determine whether the VRU is positioned in a special zone corresponding to a sidewalk area close to the crosswalk in consideration of the first threshold time T_zone1 and/or the third threshold time T_zone3 in addition to the second threshold time T_zone or T_zone2, which is the preset threshold time described with reference to FIG. 17. In this case, when it is estimated that the VRU is positioned in the special zone, the RSU may provide an appropriate service corresponding to the special zone to a nearby vehicle, a nearby VRU, or the VRU. Here, the first threshold time for the special zone may be determined based on the width of the first zone Zone1, the height of the RSU, and the distance between RSUs. In addition, the third threshold time for the special zone may be determined through pre-measurement or pre-calculation based on the width of the third zone Zone3, the height of the RSU, and the distance between RSUs. The first threshold time T_zone1 and the third threshold time T_zone3 may be preconfigured to have the same value. Alternatively, the threshold time (the first threshold time or the third threshold time) for the special zone may be determined or corrected in further consideration of multiple paths and signal attenuation effects according to the surrounding environment (street trees, traffic light supports, nearby buildings, etc.).

Specifically, when the first difference is greater than the second threshold time and less than the first threshold time, and the VRU signal is first received through the first distributed antenna RSU 1, the RSU may estimate or determine that the VRU corresponding to the VRU signal is positioned in the first zone. Alternatively, when the first difference is greater than the second threshold time and less than the first threshold time (or third threshold time), and the VRU signal is first received through the second distributed antenna RSU 2, the RSU may estimate that the VRU corresponding to the VRU signal is positioned in the third zone.

Alternatively, when the first difference is greater than the first threshold time and the VRU signal is first received through the first distributed antenna RSU 1, the RSU may estimate that the VRU corresponding to the VRU signal is outside the first zone (that is, the VRU is not positioned in any of the first to third zones). Alternatively, when the first difference is greater than the first threshold time (or third threshold time) and the VRU signal is first received through the second distributed antenna RSU 2, the RSU may estimate that the VRU corresponds to the VRU signal is positioned outside the third zone (i.e., the VRU is not positioned in any of the first to third zones).

Hereinafter, a system configuration in which the RSU estimates a position of a VRU based on a difference in reception time of a VRU signal between two distributed antennas will be described in detail.

Figure 19:
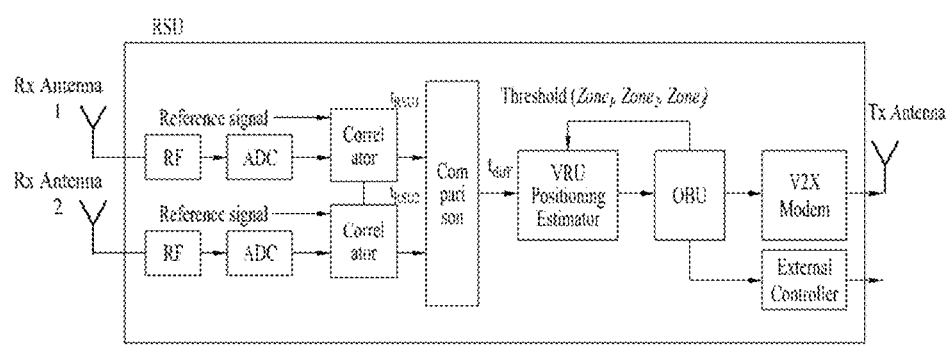
FIGS. 19 and 20 illustrate a system configuration and a system operation method for an RSU including two distributed antennas.
Figure 20:
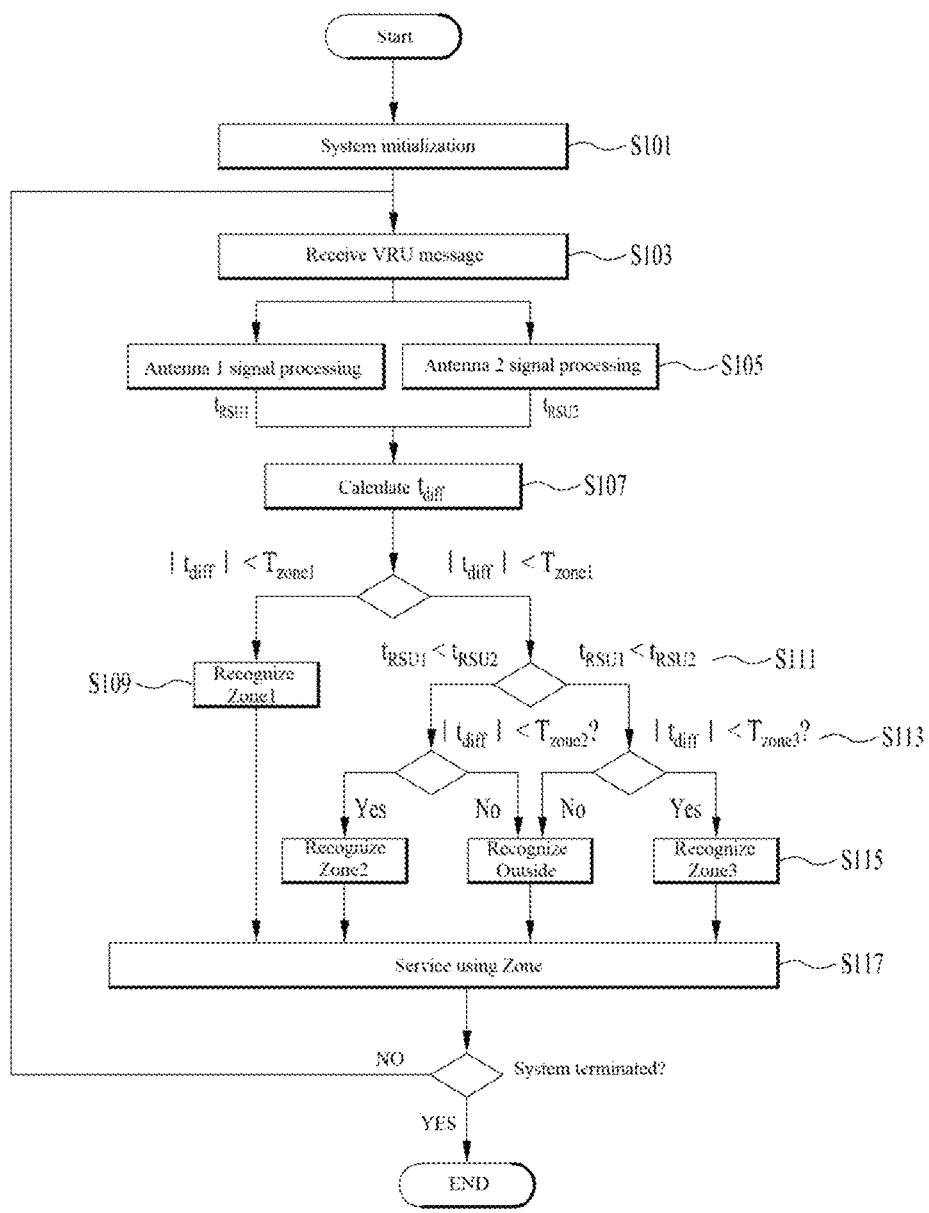

FIGS. 19 and 20 illustrate a system configuration and a system operation method for an RSU including two distributed antennas.

Referring to FIG. 19, the RSU may include a first distributed antenna (Rx Antenna 1) and a second distributed antenna (Rx Antenna 2). Each of the first distributed antenna and the second distributed antenna may receive a signal through an RF module and an ADC block. Thereafter, the RSU may estimate a reception time of a signal received from the VRU based on correlation using a reference signal. Thereafter, the comparison block may calculate a difference between the estimated reception times on the respective antennas. In this regard, a VRU position estimator is provided with a specific threshold time (first threshold time, second threshold time, and/or third threshold time) from an OBU (a unit providing VRU positioning service). The VRU position estimator may estimate the position of the VRU through the above-described algorithm based on the first difference, which is the time difference, and the specific threshold time. Thereafter, the OBU may provide a V2X service corresponding to the position of the VRU based on the estimated VRU position.

Hereinafter, a method for estimating the position of a VRU by the RSU using distributed antennas will be described in detail based on the above-described configurations.

Referring to FIG. 20, when the system is started, the RSU or VRU position estimator may perform initialization and wait to receive a VRU signal (S101). The first distributed antenna (antenna 1) and the second distributed antenna (antenna 2) may receive a signal of the VRU (or a VRU signal) (S103).

Next, the RSU may process the signals received through the first distributed antenna and the second distributed antenna to estimate a reception time for each antenna (S105). For example, the RSU may digitally process the analog signals received through the respective antennas through the ADC, find a peak point using the correlation of the digitally processed signals with the reference signal, and calculate times (first reception time t_RSU1 and second reception time t_RSU2) corresponding to the peak point.

Next, the RSU may calculate a first difference t_diff, which is a difference between the first reception time t_RSU1 and the second reception time t_RSU2 (S107). Specifically, the RSU may calculate the first difference t_diff by subtracting the second reception time from the first reception time when the VRU signal is received through the first distributed antenna. When the absolute value of the first difference is less than the second threshold time T_zone2, the RSU may estimate or recognize that the VRU is positioned in the second zone Zone2 on the crosswalk (S109).

Alternatively, when the first difference is greater than the second threshold time, the RSU may estimate that the VRU is positioned outside the crosswalk. In this case, the RSU may estimate which side of the crosswalk the VRU is positioned based on the position of the antenna through which the signal is first received between the first distributed antenna and the second distributed antenna. That is, the signal may be first received through the distributed antenna closer to the VRU between the first distributed antenna and the second distributed antenna (S111).

Next, the RSU may compare the first difference with a preconfigured first threshold time or third threshold time (S113).

Specifically, the RSU may compare the first difference with the preconfigured first threshold time or third threshold time, and determine, based on the result of comparison of the first reception time and the second reception time, that the VRU is positioned in the first zone, the third zone or the outside zone (a zone excluding the first and third zones) (S115).

For example, when the first reception time is earlier than the second reception time, and the first difference is greater than the second threshold time but less than the first threshold time, the RSU may estimate that the VRU is positioned in the first zone (Zone1). Alternatively, when the first reception time is later than the second reception timing, and the first difference is greater than the second threshold time but less than the first threshold time or the third threshold time, the RSU may estimate that the VRU is positioned in the third zone Zone3. When the first difference is greater than the second threshold time or the third threshold time, the RSU may estimate that the VRU is positioned in the outside zone.

Next, the RSU or the VRU position estimator may transmit information on the estimated position of the VRU to the OBU, and the OBU may provide an appropriate service to a nearby VRU and nearby vehicles based on the estimated position of the VRU (S117).

As described above, the RSU may estimate or determine a zone where the VRU is positioned based on the difference in reception time between two distributed antennas or the difference in reception time between three distributed antennas. In this case, the RSU may provide an appropriate V2X service to an adjacent VRU, a nearby vehicle, and/or the VRU according to the estimated position of the VRU. Specifically, the RSU may trigger transmission of a signal corresponding to a jaywalking service, a correction service of the position information about the VRU, an adaptive crosswalk signal control system, or the like based on the estimated position of the VRU. Related details will be described later with reference to FIGS. 21 to 24.

Figure 21:
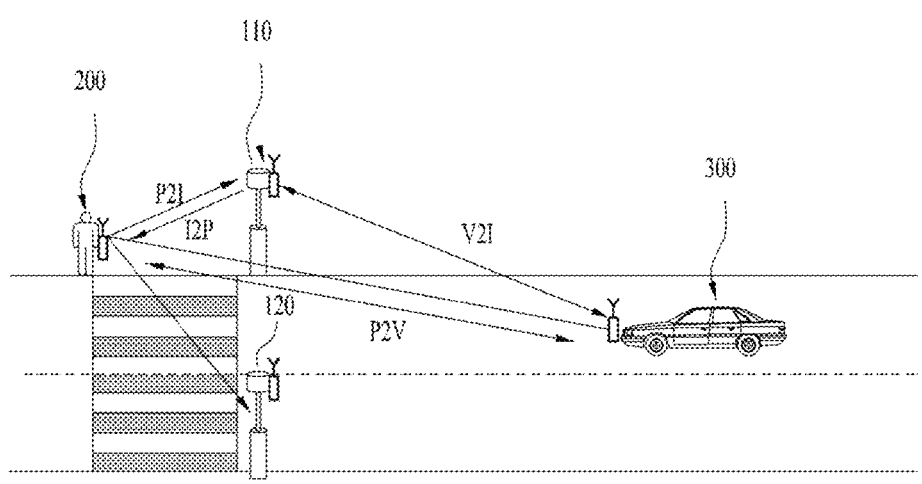
FIGS. 21 and 22 illustrate a method for providing a V2X service by an RSU based on estimation of the location of a VRU.
Figure 22:
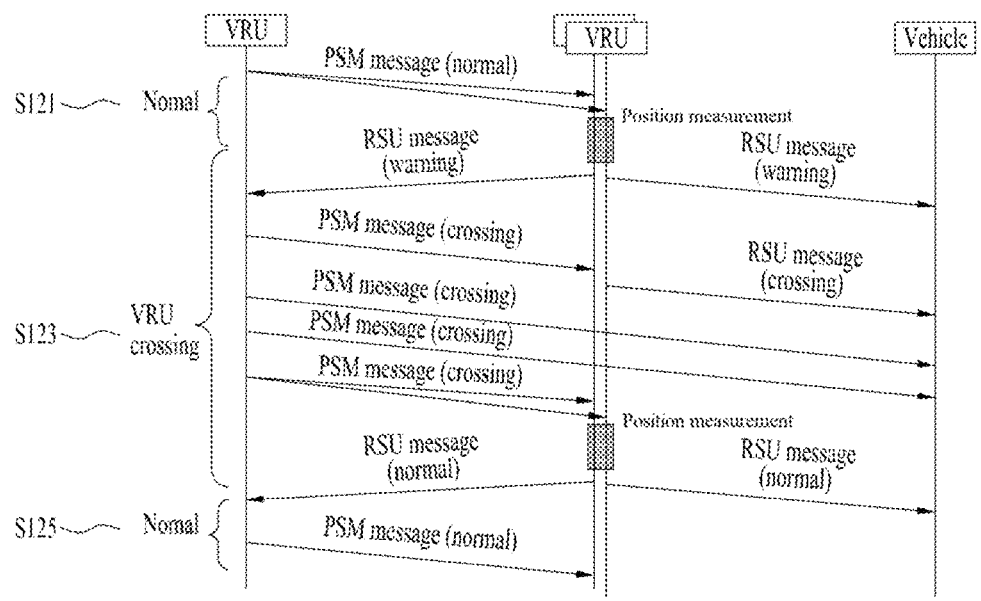

FIGS. 21 and 22 illustrate a method for providing a V2X service by an RSU based on estimation of the location of a VRU.

Referring to FIG. 21, the VRU 200 may periodically transmit a VRU signal or a signal to a nearby vehicle using a V2X link. As described above, due to inaccurate GPS performance of the VRU, the VRU signal may erroneously include position information about the VRU corresponding to a position on the road although the VRU is positioned on the sidewalk. In this case, a false warning signal may be transmitted to nearby vehicles. In another case, when the VRU is positioned on the road, the VRU signal may erroneously include position information about the VRU corresponding to a position on the sidewalk.

In this way, in order to prevent inaccurate measurement of the position of the VRU, which may lead to provision of an incorrect V2X service, the RSU may estimate the exact position of the VRU using two distributed antennas 110 and 120 or three distributed antennas (hereinafter, multiple distributed antennas). For example, when the VRU 200 transmits a VRU signal (false alarm) including incorrect position information indicating that the VRU is on the road while actually being on the sidewalk, the RSU may transmit, based on the result of position estimation obtained using the multiple distributed antennas, an auxiliary signal (or an auxiliary signal through an I2P link) to the VRU to correct the incorrect position information. Alternatively, when the VRU jaywalks at a red signal, the RSU may estimate that the VRU is on the crosswalk according to the above-described position estimation method. Thus, the RSU may inform nearby vehicles of a dangerous situation of jaywalking through a V2I signal on behalf of the VRU.

Referring to FIG. 22, the RSU may receive a VRU signal (or PSM) periodically transmitted by the VRU 200 through the multiple distributed antennas. The position of the VRU may be estimated based on the difference in reception time between the respective distributed antennas. When the RSU estimates that the VRU that has transmitted the VRU signal has entered the crosswalk based on the difference in the reception time of the received VRU signal, the RSU may transmit a warning signal to the VRU 200 and/or nearby vehicles 300 (S121).

Next, when crossing the crosswalk, the VRU may periodically transmit a VRU signal or PSM including information on the crossing state of the crosswalk. Alternatively, when the VRU receives the warning signal from the RSU, it may add, to the VRU signal thereof, information indicating that the VRU is crossing the crosswalk. In addition, the RSU may continuously monitor the VRU positioned in the crosswalk zone (estimate the crossing state of the crosswalk) based on the VRU signal, and transmit the RSU signal including the information about the crossing state of the VRU to nearby vehicles (S123).

Next, the RSU may estimate that the VRU has crossed the road, based on a difference in reception time between the multiple distributed antennas (or based on multi-antenna signal processing). When the end of road crossing of the VRU is estimated, the RSU may transmit an RSU signal including information on the end of road crossing of the VRU to the VRU or nearby vehicles. In this case, the VRU may periodically transmit the VRU signal or PSM changed back to the normal state (S125).

Figure 23:
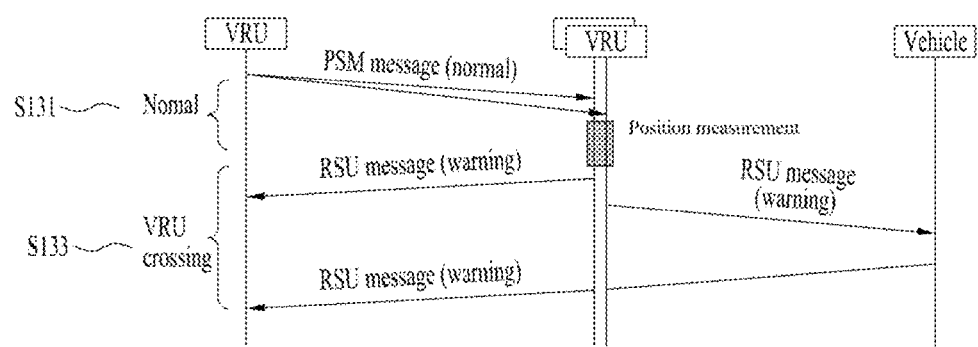
FIGS. 23 and 24 illustrate a method for providing a V2X related service corresponding to an area in which the location of a VRU is estimated.
Figure 24:
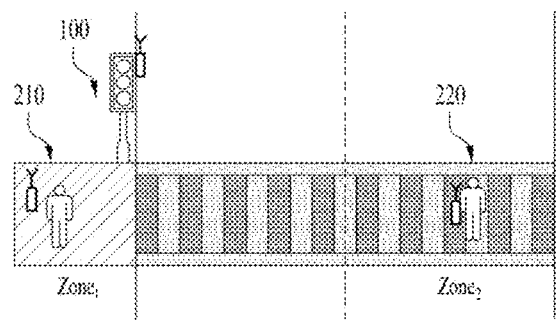

FIGS. 23 and 24 illustrate a method for providing a V2X related service corresponding to an area in which the location of a VRU is estimated.

Referring to FIG. 23, when the VRU stops jaywalking, the RSU may perform a corresponding operation. Specifically, the VRU may continuously transmit a VRU signal (or a PSM signal). The RSU may estimate the entry of the VRU into the crosswalk through signal processing based on a difference in reception timing between multiple distributed antennas based on the VRU signal (S131). In this case, the RSU may transmit a warning signal to nearby devices according to the entry of the VRU into the crosswalk. When a response of Nack to the warning signal (response of decoding failure or continuation of driving to the warning signal) is received, the RSU may transmit an alarm signal to the VRU to stop jaywalking of the VRU (S133).

Alternatively, the RSU may control a traffic light related to the crosswalk by an operation of providing an appropriate V2X communication service according to a zone in which the VRU is positioned (adaptive crosswalk signal change system). Referring to FIG. 24, the RSU may estimate the position of the VRU 100 using multiple distributed antennas. When the VRU stops in front of a crosswalk, the RSU may detect, for a specific time or longer, a VRU signal transmitted by the VRU estimated to be in the first zone (Zone1). In this case, the RSU may quickly change the signal of the traffic light into a walking signal to allow the VRU to cross the crosswalk. In addition, when the VRU type is related to a visual impairment, the VRU may provide a service for announcing the state of the traffic light through voice guidance.

Next, the RSU may continuously estimate or monitor the position of the VRU even after changing the state of the traffic light. When the walking state of the traffic light is expected to end soon but the position of the VRU is still estimated to be in the second zone (Zone2), the RSU may transmit a warning signal to the VRU to inform that the walking state will soon expire or may provide voice guidance while transmitting a warning signal to nearby vehicles to inform that a pedestrian may be present even when the traffic light state changes. Alternatively, when the type of the VRU is related to the elderly and weak, the RSU may extend the time for maintenance of the walking state of the traffic light based on the estimated position of the VRU.

In this way, the proposed invention may provide a new position recognition method and performance to support the safety service for the VRU. In other words, the proposed invention may greatly improve the performance in recognizing the position of an adjacent VRU through simple signal processing using multiple distributed antennas of an RSU installed in a danger zone. In addition, the proposed invention may significantly improve the performance of recognition of the position of the VRU by using various signals such as conventional Wi-Fi, Bluetooth, and UWB, regardless of the influence of the safety service PHY layer of the C-ITS.

Figure 25:
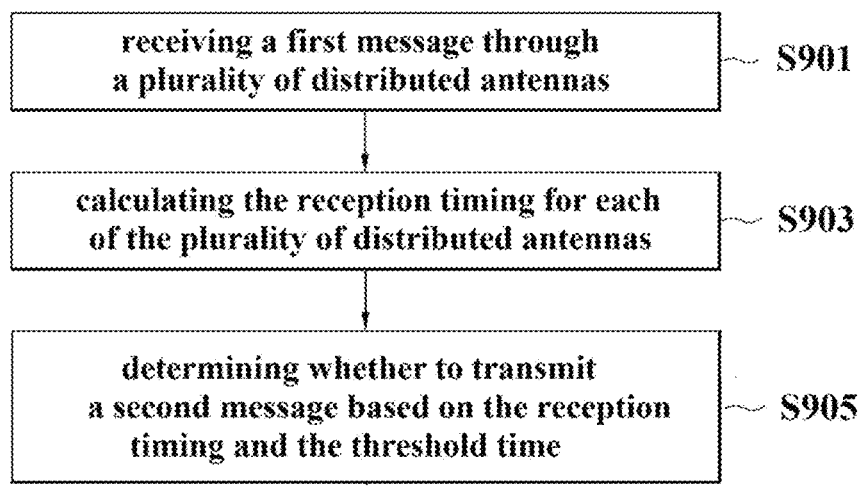
FIG. 25 is a flowchart illustrating a method for providing a V2X related service based on a difference in signal reception timing between multiple distributed antennas.

FIG. 25 is a flowchart illustrating a method for providing a V2X related service based on a difference in signal reception timing between multiple distributed antennas.

Referring to FIG. 25, a device (or RSU or UE) may receive a first signal through each of a multiple distributed antennas. The first signal may be a PSM or a VRU awareness message (VAM) periodically transmitted by the VRU or UE to signal presence thereof. Here, the first signals received through each of the multiple distributed antennas may be the same signal received at a different reception time (S901).

Next, the device may measure or calculate a reception time when the first signal is received by each of the multiple distributed antennas (S903). As described above, the reception time for each distributed antenna may be measured or calculated based on the peak point through correlation with a reference signal. For example, the multiple distributed antennas including a first distributed antenna, a second distributed antenna, and a third distributed antenna may receive the first signal at different reception times according to a separation distance between the antennas and the position of a VRU that has transmitted the first signal.

Next, the device may determine whether to transmit a second signal for providing a V2X related service based on the reception time of the first signal calculated for each of the distributed antennas and a preconfigured threshold time (or threshold time) (S905).

Alternatively, when the difference in reception time between the multiple distributed antennas is less than (or less than or equal to) a preconfigured threshold time, the device may transmit the second signal. Alternatively, when the difference in reception time between the multiple distributed antennas is greater than or equal to (or exceeds) a preconfigured threshold time, the device may skip transmission of the second signal.

Specifically, the device may calculate the difference in reception time between the multiple distributed antennas. When the calculated difference is less than the threshold time, the device may estimate that the VRU having transmitted the first signal is positioned in a specific zone, determine a V2X service corresponding to the estimated specific zone, generate a second signal corresponding to the determined V2X service, and transmit the second signal to other devices through a sidelink or the like.

Alternatively, the multiple distributed antennas may be spaced apart from each other by a predetermined distance in one axial direction (or one direction, one straight line) in a distributed manner. The one axial direction may be a direction perpendicular to the road direction, and may be set, for example, to a direction corresponding to the direction of the crosswalk, as shown in FIGS. 12 and 13. Here, the predetermined distance may be predetermined based on a road width, a position of a center line, and a boundary between the road and the sidewalk. For example, as shown in FIGS. 12 and 13, the first distributed antenna may be distributed on the left side of the road, the second distributed antenna may be positioned on the center line of the road, and the third distributed antenna may be distributed on the right side of the sidewalk.

Alternatively, the multiple distributed antennas may include a first distributed antenna, a second distributed antenna, and a third distributed antenna. In this case, the device may calculate a first reception time when the first signal is received through the first distributed antenna, a second reception time when the signal is received through the second distributed antenna, and a third reception time when the signal is received through the third distributed antenna may be calculated. Alternatively, the device may calculate a first difference between the second reception time and the first reception time, and a second difference between the second reception time and the first reception time.

Alternatively, the device may determine whether to transmit the second signal by comparing the threshold time with a difference related to a distributed antenna through which the first signal is received first between the first distributed antenna and the third distributed antenna. For example, when the first signal is received earlier through the first distributed antenna than through the third distributed antenna, the device may determine whether to transmit the second signal by comparing a first difference that is a difference in reception time between the first distributed antenna and the second distributed antenna with the threshold time. Alternatively, for example, when the first signal is received earlier through the third distributed antenna than through the first distributed antenna, the device determine whether to transmit the second signal by comparing a second difference that is a difference in reception time between the second distributed antenna and the third distributed antenna with the threshold time.

The threshold time may be configured differently depending on the distributed antenna through which the first signal is first received. Specifically, when the first signal is first received through the first distributed antenna, the threshold time may be configured as a first threshold time. When the first signal is first received through the second distributed antenna, the threshold time may be configured as a second threshold time. When the first signal is first received through the third distributed antenna, the threshold time may be configured as a third threshold time.

For example, referring to FIG. 13-(a), the threshold time may include a first threshold time for estimating whether the VRU is positioned in a first zone (partial area of a sidewalk), a second threshold time for estimating whether the VRU is positioned in a second zone (crosswalk or road area), and a third threshold time for estimating whether the VRU is positioned in a third zone (partial area of a sidewalk).

Specifically, when the first signal is first received through the first distributed antenna, the device may estimate whether the VRU is positioned in the first zone by comparing the first difference with the first threshold time, and determine whether to transmit the second signal based on the result of the estimation. Alternatively, when the first signal is first received through the second distributed antenna, the device may estimate whether the VRU is positioned in the second zone by comparing the first difference (or second difference) with the second threshold time, and determine whether to transmit the second signal based on the result of the estimation. Alternatively, when the first signal is first received through the third distributed antenna, the device may estimate whether the VRU is positioned in the third zone by comparing the second difference with the third threshold time, and determine whether to transmit the second signal based on the result of the estimation.

That is, the device may determine a corresponding difference and a threshold time according to the distributed antenna through which the first signal is received first, and determine whether to transmit the second signal based on the determined difference and threshold time.

In other words, the device may determine a threshold time and a difference for determining whether to transmit the second signal in consideration of the distributed antenna through which the first signal is received first. For example, when the first signal is first received through the first distributed antenna, the device may transmit the second signal when the first difference is less than (or less than or equal to) the first threshold time. When the first signal is first received through the third distributed antenna, the device may transmit the second signal when the second difference is less than (or less than or equal to) the third threshold time. When the first signal is first received through the second distributed antenna, the device may transmit the second signal when the first difference (or the second difference) is less than (or less than or equal to) the second threshold time.

Also, the type of the second signal may be determined according to the distributed antenna through which the first signal is first received among the first to third distributed antennas. Hereinafter, it is assumed that the second signal is transmitted when the first difference or the second difference is less than the threshold time.

Specifically, when the first signal is first received through the second distributed antenna, the device may transmit the second signal to nearby vehicles as a warning signal indicating that a dangerous situation may occur during driving because a VRU or a pedestrian is positioned on the road. Here, the second signal may be transmitted to the nearby vehicles through a V2I link. That is, when the first signal is first received through the second distributed antenna, the second signal may be transmitted as a signal type corresponding to a V2X service for notifying a nearby driving vehicle of a collision risk situation. In other words, when it is estimated that the VRU is positioned in the second zone, the RSU may trigger transmission of the second signal, and the second signal may be transmitted as a warning signal indicating that there is a risk of collision due to the presence of a pedestrian and a VRU on the road.

Alternatively, when the first signal is first received through the first distributed antenna or the third distributed antenna, the device may transmit a second signal requesting correction of the position information included in the first signal. For example, when the position information included in the first signal belongs to the second zone, the device may determine that there is an error in the position information, and transmit, to the VRU, the second signal of the type corresponding to a V2X service requesting correction of the position information. In this case, the second signal may be transmitted through a P2I link.

Alternatively, when the first signal is first received through the first distributed antenna or the third distributed antenna, the device may transmit the second signal of a signal type corresponding to a V2X service for controlling a signal of an adjacent traffic light. For example, when the first signal is first received through the first distributed antenna and the first difference is less than the threshold time, the device may estimate that the VRU is positioned in a first zone, which is a sidewalk area adjacent to a crosswalk. In this case, the device may transmit, to the adjacent traffic light, a control signal (or the second signal) for changing the signal of the adjacent traffic light to a drivable state (green light).

In this way, the device may determine whether to transmit the second signal based on the position of the distributed antenna through which the first signal is first received, the reception time (or reception timing) of the first signal for each distributed antenna, and the threshold time, and determine an appropriate type of the second signal according to the position of the VRU, thereby providing an appropriate V2X service to the VRU and/or nearby vehicles.

Communication System Example to which the Present Invention is Applied

Although not limited thereto, various descriptions, functions, procedures, proposals, methods, and/or operational flow charts of the present invention disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 26:
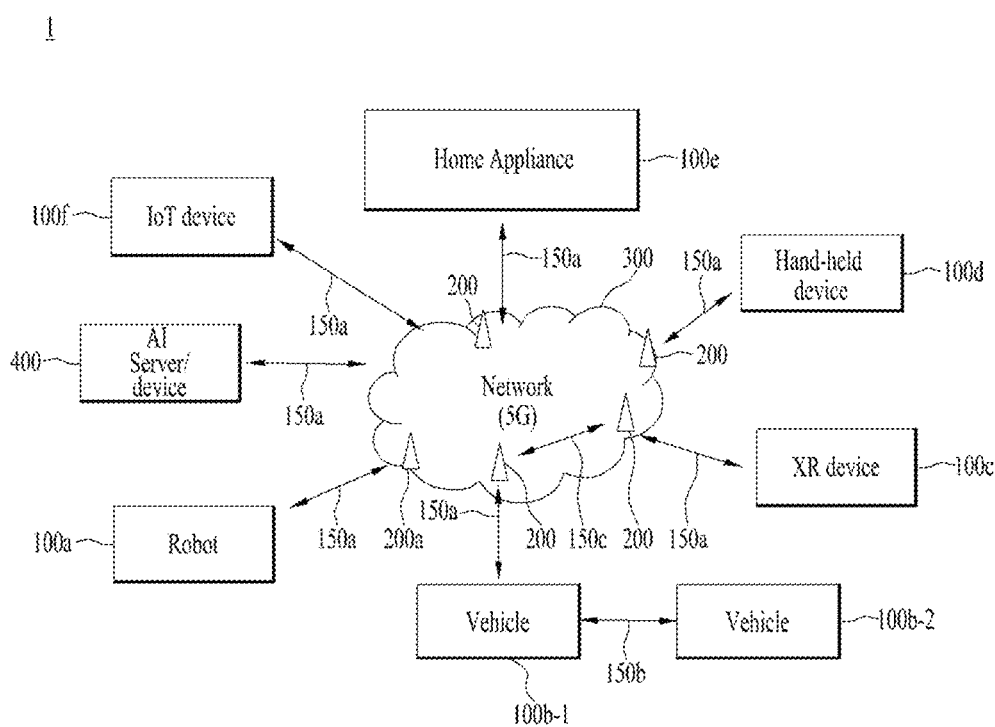
FIG. 26 illustrates a communication system applied to the present invention.

FIG. 26 illustrates a communication system applied to the present invention.

Referring to FIG. 26, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Devices to which the Present Invention is Applied

Figure 27:
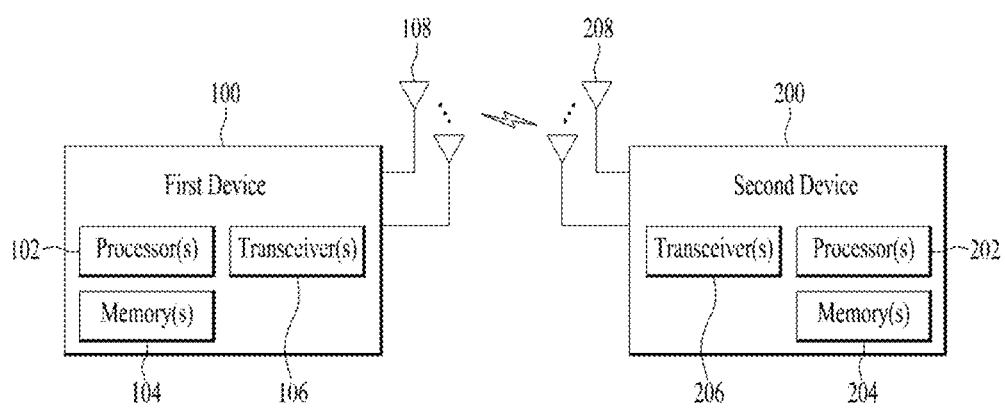
FIG. 27 illustrates wireless devices applicable to the present invention.

FIG. 27 illustrates a wireless device applicable to the present invention.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

Specifically, the UE may include a processor 102 and a memory 104 coupled to the RF transceiver. The memory 104 may include at least one program capable of performing operations related to the embodiments described with reference to FIGS. 10 to 25. Here, the RF transceiver may include multiple distributed antennas.

The processor 102 may control the multiple distributed antennas to receive a first signal through each of the plurality of distributed antennas, calculate a reception time when the first signal is received through each of the plurality of distributed antennas, and determine whether to transmit a second signal for providing the V2X related service based on the received reception time and the threshold time. The processor 102 may perform operations of determining whether to transmit the second signal and determining the type of the second signal according to the embodiments described with reference to FIGS. 10 to 25, based on the program included in the memory 104.

Alternatively, a chipset including the processor 102 and the memory 104 may be configured. In this case, the chipset includes at least one processor and at least one memory operatively connected to the at least one processor and configured to cause, when executed, the at least one processor to perform an operation. The operation may include receiving a first signal from each of multiple distributed antennas, calculating a reception time when the first signal is received through each of the multiple distributed antennas, and determining whether to transmit the second signal for providing the V2X related service based on the calculated reception time and threshold time. In addition, the operation may include operations of determining whether to transmit the second signal and determining the type of the second signal according to the embodiments described with reference to FIGS. 10 to 25 based on the program included in the memory 104.

Alternatively, provided is a computer-readable storage medium including at least one computer program for causing the at least one processor to perform an operation. The operation may include receiving a first signal through each of multiple distributed antennas, calculating a reception time when the first signal is received through each of the distributed antennas, and determining whether to transmit the second signal for providing the V2X related service based on the calculated reception time and the threshold time. In addition, the operation may include operations of determining whether to transmit the second signal and determining the type of the second signal according to the embodiments described with reference to FIGS. 10 to 25 based on the program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

Figure 28:
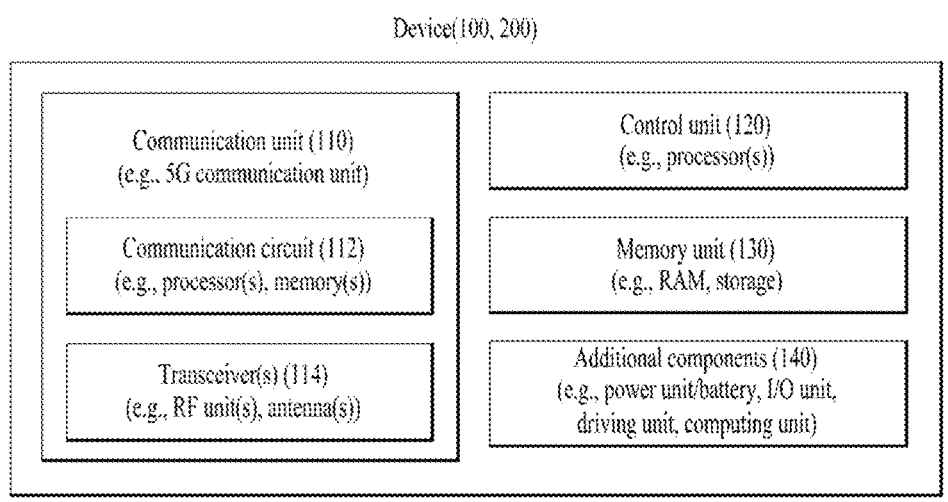
FIG. 28 illustrates another example of a wireless device to which the present invention is applied.

FIG. 28 illustrates another example of a wireless device applied to the present invention. The wireless device may be implemented in various forms according to a use-case/service (refer to FIG. 26)

Referring to FIG. 28, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 26), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/ device (400 of FIG. 26), the BSs (200 of FIG. 26), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 29:
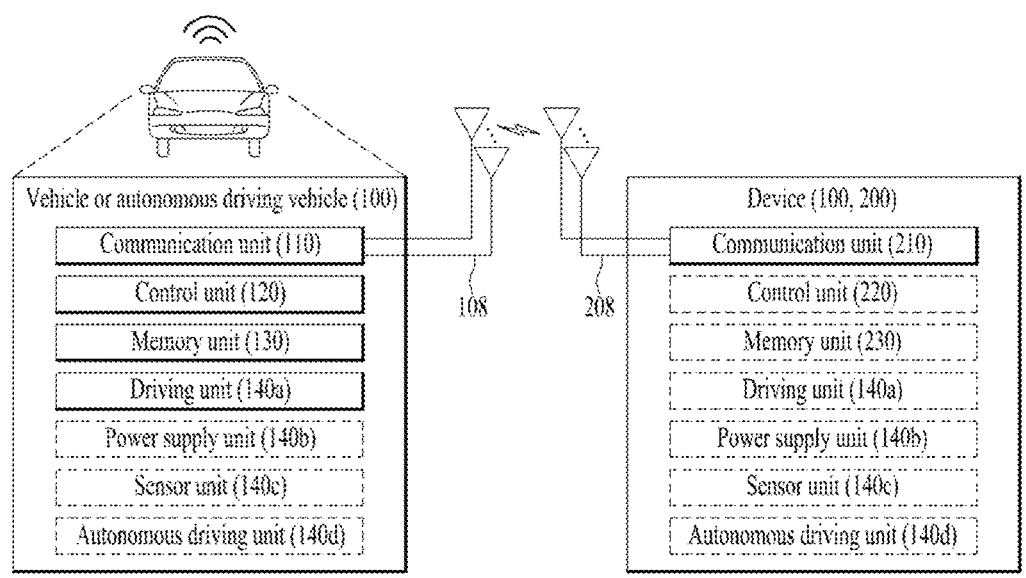
FIG. 29 illustrates a vehicle or an autonomous driving vehicle applied to the present invention.

Examples of Vehicles or Autonomous Vehicles to which the Present Invention is Applied FIG. 29 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/ reception relationship between a terminal and a base station.

Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method for providing a vehicle-to-everything (V2X) related service by a device including a plurality of distributed antennas in a wireless communication system supporting sidelink, the method comprising:
receiving a first signal through each of the plurality of distributed antennas; and
determining whether to transmit a second signal for providing the V2X related service,
wherein the plurality of distributed antennas comprises a first distributed antenna and a second distributed antenna distributed by a predetermined distance from each other, and
wherein the second signal is transmitted based on a difference between a first reception time at which the first signal is received through the first distributed antenna and a second reception time at which the first signal is received through the second distributed antenna being less than a threshold time.

2. The method of claim 1, wherein the plurality of distributed antennas further comprises a third distributed antenna distributed by the predetermined distance from the second distributed antenna in a direction in which the first distributed antenna and the distribute second antenna are distributed.

3. The method of claim 2, wherein the first reception time is determined by a reception time of a distributed antenna from which the first signal was received first among the first distributed antenna and the second distributed antenna.

4. The method of claim 2, wherein the threshold time is set differently according to a distributed antenna receiving the first signal first among the first distributed antenna, the second distributed antenna, and the third distributed antenna.

5. The method of claim 2, wherein the predetermined distance is predetermined based on a width of a road having the device positioned thereon.

6. The method of claim 2, wherein a signal type of the second signal is determined based on a distributed antenna receiving the first signal first among the first distributed antenna, the second distributed antenna, and the third distributed antenna.

7. The method of claim 6, wherein, on a basis that the first signal is first received through the second distributed antenna, the second signal is a warning signal notifying nearby vehicles of presence and danger of a pedestrian on a road.

8. The method of claim 6, wherein, on a basis that the first signal is first received through the first distributed antenna or the third distributed antenna, the second signal is a control signal for controlling a signal of an adjacent traffic light.

9. The method of claim 6, wherein, on a basis that the first signal is first received through the first distributed antenna or the third distributed antenna, the second signal is a signal indicating correction of VRU position information included in the first signal.

10. The method of claim 1, wherein:
the first signal is a personal safety message (PSM) transmitted from a vulnerable road user (VRU); and
the device is a road side unit (RSU).

11. A device configured to provide a vehicle-to-everything (V2X) related service in a wireless communication system supporting sidelink, the device comprising:
a plurality of distributed antennas; and
a processor connected to the plurality of distributed antennas,
wherein the processor is configured to:
control the plurality of distributed antennas to receive a first signal through each of the plurality of distributed antennas;
calculate a reception time when the first signal is received through each of the plurality of distributed antennas; and
determine whether to transmit a second signal for providing the V2X related service based on the calculated reception time and a threshold time,
wherein the plurality of distributed antennas comprises a first distributed antenna and a second distributed antenna distributed by a predetermined distance from each other, and
wherein the second signal is transmitted based on a difference between a first reception time at which the first signal is received through the first distributed antenna and a second reception time at which the first signal is received through the second distributed antenna being less than the threshold time.

12. A chipset configured to provide a vehicle-to-everything (V2X) related service in a wireless communication system supporting sidelink, the chipset comprising:

at least one processor; and at least one memory operatively coupled to the at least one processor and configured to cause, when executed, the at least one processor to perform operations comprising:

receiving a first signal through each of a plurality of distributed antennas;

calculating a reception time when the first signal is received through each of the plurality of distributed antennas; and determining whether to transmit a second signal for providing the V2X related service based on the calculated reception time and a threshold time, wherein the plurality of distributed antennas comprises a first distributed antenna and a second distributed antenna distributed by a predetermined distance from each other, and wherein the second signal is transmitted based on a difference between a first reception time at which the first signal is received through the first distributed antenna and a second reception time at which the first signal is received through the second distributed antenna being less than the threshold time.

\* \* \* \* \*